(12) United States Patent
Mizutani

(10) Patent No.: US 7,062,333 B2
(45) Date of Patent: Jun. 13, 2006

(54) OPTIMAL SOLUTION SEARCH DEVICE, DEVICE FOR CONTROLLING CONTROLLED OBJECT BY OPTIMIZING ALGORITHM, AND OPTIMAL SOLUTION SEARCH PROGRAM

(75) Inventor: Takaaki Mizutani, Hamamatsu (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 464 days.

(21) Appl. No.: 10/467,872

(22) PCT Filed: Feb. 5, 2002

(86) PCT No.: PCT/JP02/00932

§ 371 (c)(1),
(2), (4) Date: Aug. 8, 2003

(87) PCT Pub. No.: WO02/069257

PCT Pub. Date: Sep. 6, 2002

(65) Prior Publication Data

US 2004/0078095 A1    Apr. 22, 2004

(30) Foreign Application Priority Data

Feb. 23, 2001    (JP) .............................. 2001-049342

(51) Int. Cl.
*G05B 13/02*    (2006.01)
(52) U.S. Cl. ............................ 700/28; 700/28; 700/31; 700/29; 700/32; 700/19; 700/20; 700/200; 700/287; 700/44; 700/300; 706/71.2
(58) Field of Classification Search .................. 700/28, 700/29, 32, 19, 20, 200, 287, 44, 300; 706/71.2
See application file for complete search history.

(56) References Cited

U.S. PATENT DOCUMENTS 5,418,858 A * 5/1995 Shoureshi .................. 381/71.2
(Continued)

FOREIGN PATENT DOCUMENTS

| EP | 1033637 A1 | 9/2000 | |
| EP | 1039356 A1 | 9/2000 | |
| EP | 001372107 A1 * | 12/2003 | .................. 700/32 |

OTHER PUBLICATIONS

English translation of International Preliminary Examination Report dated Jul. 2, 2003.
International Search Report dated Apr. 16, 2002.

*Primary Examiner*—Anthony Knight
*Assistant Examiner*—Sunray Chang
(74) *Attorney, Agent, or Firm*—Young & Basile, P.C.

(57) ABSTRACT

To provide an algorithm-based optimizing controller which can search for an optimal solution in line with user requirements with reduced time requirements for optimization.

An interactive optimizer 310 searches for an optimal solution of a responsivity calculator 342 using a GA while repeatedly evaluating, interactively, responsivity outputted from the responsivity calculator 342 which receives control coefficients that affect control characteristics of the interactive optimizer 310 and outputs the responsivity. An autonomous optimizer 350 searches for an optimal solution of a fuel consumption calculator 372 using the GA while repeatedly evaluating, autonomously, fuel consumption outputted from the fuel consumption calculator 372 such that the responsivity will be within a predetermined range based on the responsivity determined from the optimal solution found in the optimization of the interactive optimizer 310 using the fuel consumption calculator 372 which receives control coefficients that affect control characteristics of the autonomous optimizer 350 and outputs the fuel consumption.

9 Claims, 11 Drawing Sheets

U.S. PATENT DOCUMENTS

| | | | |
|---|---|---|---|
| 5,877,954 A * | 3/1999 | Klimasauskas et al. | 700/29 |
| 5,963,458 A * | 10/1999 | Cascia | 700/300 |
| 6,032,139 A * | 2/2000 | Yamaguchi et al. | 706/13 |
| 6,487,459 B1 * | 11/2002 | Martin et al. | 700/44 |
| 6,549,815 B1 * | 4/2003 | Kaji | 700/32 |
| 6,950,711 B1 * | 9/2005 | Havener et al. | 700/28 |

* cited by examiner

OPTIMAL SOLUTION SEARCH DEVICE, DEVICE FOR CONTROLLING CONTROLLED OBJECT BY OPTIMIZING ALGORITHM, AND OPTIMAL SOLUTION SEARCH PROGRAM

TECHNICAL FIELD

The present invention relates to a device and program which search for an optimal solution of evaluation function using an optimizing algorithm and, more particularly, to an optimal solution search device, algorithm-based optimizing controller, and optimal solution search program which can search for an optimal solution in line with user requirements with reduced time requirements for optimization.

BACKGROUND ART

Conventionally, when controlling characteristics of products such as vehicles or household electric appliances, the characteristics of the products to be controlled are decided so as to suit as wide a range of users as possible by taking tastes and usage patterns of target users who are expected to use the products into consideration in the development and design phases. However, since the user who will use the above-mentioned products have their own individuality and vary widely in tastes, it is practically impossible to provide characteristics which will satisfy all the users even if the products are developed and designed by taking the tastes of the target users into consideration as described above. To solve this problem, methods are followed which change control characteristics in such a way as to satisfy users by estimating tastes and usage patterns of the users after sales using optimizing algorithms such as a GA.

To optimize control characteristics using an optimizing algorithm, either an autonomous evaluation method or interactive evaluation method is adopted: the former optimizes control characteristics by autonomously evaluating digitalized control results based on predetermined evaluation criteria and the latter optimizes control characteristics interactively by presenting control results to the user.

The autonomous evaluation method, which makes evaluation based on predetermined evaluation criteria, can optimize control characteristics in a relatively short period of time, but is not suitable if evaluation criteria according to which optimal values correspond to user tastes vary with the user. In contrast, the interactive evaluation method is suitable for cases in which evaluation criteria according to which optimal values correspond to user tastes vary with the user. However, it is not possible to get many evaluation from the user in a short period of time. Thus, it takes a relatively long time to optimize, for example, all the control characteristics of a vehicle when this method is used alone.

The present invention has been made in view of such prior art problems yet to be solved. Its object is to provide an optimal solution search device, algorithm-based optimizing controller, and optimal solution search program which can search for an optimal solution in line with user requirements with reduced time requirements for optimization.

DISCLOSURE OF THE INVENTION

To achieve the above object, the present invention provides an optimal solution search device which searches for an optimal solution of an evaluation function by repeatedly evaluating output from the evaluation function using an optimizing algorithm, characterized in that searches based on the optimizing algorithm are carried out using a combination of interactive evaluation method evaluating the output from the evaluation function based on interaction with a user and autonomous evaluation method evaluating the output from the evaluation function based on predetermined evaluation criteria.

With this configuration, as the output from the evaluation function are evaluated repeatedly through the combination of the autonomous evaluation method and interactive evaluation method, an optimal solution of the evaluation function is searched for by the optimizing algorithm.

The invention can be used, for example, to optimize control characteristics of a controlled object. However, the invention is not limited to that, and it is applicable to various problems to which optimizing algorithms are applied conventionally. This is also true of an optimal solution search program.

Also, as the optimizing algorithm, the invention set forth in claim 1 can use an evolutionary optimizing algorithm such as GA, GP (Genetic Progress), or ES (Evolutional Strategies). Alternatively, it can use an optimizing algorithm by means of local calculations or an optimizing algorithm by means of reinforcement learning. This is also true of an algorithm-based optimizing controller as well as the optimal solution search program.

The optimal solution search device comprises: storage means for storing the output from the evaluation function; evaluation value calculation means for calculating the output from the evaluation function as evaluation value and storing it in the storage means; and evaluation input means for inputting evaluation made by the user, and the interactive evaluation method performs evaluation based on entries made through the evaluation input means and the autonomous evaluation method performs evaluation based on the evaluation value stored in the storage means.

With this configuration, the evaluation value calculation means calculates the output from the evaluation function as evaluation value and stores the calculated evaluation value in the storage means. As the user inputs evaluation on the evaluation value, interactive evaluation method performs evaluation based on the inputted evaluation. On the other hand, autonomous evaluation method performs evaluation based on the evaluation value stored in the storage means. In this way, as the output from the evaluation function are evaluated repeatedly through the combination of the autonomous evaluation method and interactive evaluation method, an optimal solution of the evaluation function is searched for by the optimizing algorithm.

The storage means stores evaluation value by every available means at all times. It may store evaluation value in advance or store evaluation value received from outside during the operation of this device instead of prestoring them. This is also true of an algorithm-based optimizing controller.

On the other hand, to achieve the above object, the present invention provides an algorithm-based optimizing controller which optimizes control characteristics of a control system by searching for an optimal solution of an evaluation function using an optimizing algorithm while repeatedly evaluating output from the evaluation function which receives input of control coefficients that affect control characteristics of the control system for controlling characteristics of a controlled object and outputs the control characteristics, characterized in that searches based on the optimizing algorithm are carried out using a combination of interactive evaluation method evaluating the output from the evaluation function based on interaction with a user and autonomous evaluation method evaluating the output from the evaluation function based on predetermined evaluation criteria.

With this configuration, as the output from the evaluation function are evaluated repeatedly through the combination of the autonomous evaluation method and interactive evaluation method, an optimal solution of the evaluation function is searched for by the optimizing algorithm. When the searches are complete, the control system operates based on the control coefficient searched for as the optimal solution, thereby optimizing the control characteristics of the control system.

The algorithm-based optimizing controller comprises: storage means for storing the output from the evaluation function; evaluation value calculation means for calculating the output from the evaluation function as evaluation value and storing it in the storage means; and evaluation input means for inputting evaluation made by the user, and the interactive evaluation method performs evaluation based on entries made through the evaluation input means and the autonomous evaluation method performs evaluation based on the evaluation values stored in the storage means.

With this configuration, the evaluation value calculation means calculates the output from the evaluation function as evaluation value and stores the calculated evaluation value in the storage means. As the user inputs evaluation on the evaluation value, interactive evaluation method performs evaluation based on content of the inputted evaluation. On the other hand, autonomous evaluation method performs evaluation based on the evaluation value stored in the storage means. In this way, as the output from the evaluation function are evaluated repeatedly through the combination of the autonomous evaluation method and interactive evaluation method, an optimal solution of the evaluation function is searched for by the optimizing algorithm.

An algorithm-based optimizing controller optimizes control characteristics of a control system by searching for an optimal solution of an evaluation function using an optimizing algorithm while repeatedly evaluating output from the evaluation function which receives input of control coefficients that affect control characteristics of the control system for controlling characteristics of a controlled object and outputs the control characteristics, characterized in that: searches based on the optimizing algorithm are carried out using a combination of interactive evaluation method evaluating the output from the evaluation function based on interaction with a user and autonomous evaluation method evaluating the output from the evaluation function based on predetermined evaluation criteria; the controller comprises a first control system for controlling a first characteristic of the controlled object, and a second control system for controlling a second characteristic of the controlled object; the first control system searches for an optimal solution of a first evaluation function using the optimizing algorithm while repeatedly evaluating, by the interactive evaluation method, the output from the first evaluation function which receives input of control coefficients that affect control characteristics of the first control system and outputs the control characteristics; and the second control system searches for an optimal solution of a second evaluation function using the optimizing algorithm while repeatedly evaluating, by the autonomous evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

With this configuration, the first control system searches for an optimal solution of the first evaluation function using the optimizing algorithm while the output from the first evaluation function are evaluated repeatedly by the interactive evaluation method. The second control system searches for an optimal solution of the second evaluation function while the output from the second evaluation function are evaluated repeatedly by the autonomous evaluation method such that the output from the first evaluation function will be within a predetermined range based on the output from the first evaluation function determined from the optimal solution found in the optimization of the first control system.

An algorithm-based optimizing controller also optimizes control characteristics of a control system by searching for an optimal solution of an evaluation function using an optimizing algorithm while repeatedly evaluating output from the evaluation function which receives input of control coefficients that affect control characteristics of the control system for controlling characteristics of a controlled object and outputs the control characteristics, characterized in that: searches based on the optimizing algorithm are carried out using a combination of interactive evaluation method evaluating the output from the evaluation function based on interaction with a user and autonomous evaluation method evaluating the output from the evaluation function based on predetermined evaluation criteria; the controller comprises a first control system for controlling a first characteristic of the controlled object, and a second control system for controlling a second characteristic of the controlled object; the first control system searches for an optimal solution of the first evaluation function using the optimizing algorithm while repeatedly evaluating, by the autonomous evaluation method, the output from the first evaluation function which receives input of control coefficients that affect control characteristics of the first control system and outputs the control characteristics; and the second control system searches for an optimal solution of a second evaluation function using the optimizing algorithm while repeatedly evaluating, by the interactive evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

With this configuration, the first control system searches for an optimal solution of the first evaluation function using the optimizing algorithm while the output from the first evaluation function are evaluated repeatedly by the autonomous evaluation method. The second control system searches for an optimal solution of the second evaluation function while the output from the second evaluation function are evaluated repeatedly by the interactive evaluation method such that the output from the first evaluation function will be within a predetermined range based on the output from the first evaluation function determined from the optimal solution found in the optimization of the first control system.

In the algorithm-based optimizing controller set forth in claim 5 or 6, the controlled object is an engine; and what undergoes the interactive evaluation among the outputs from the first evaluation function and the second evaluation function is responsivity determined by a rate of change in rotational speed of the engine and a rate of change in throttle opening while what undergoes the autonomous evaluation among the outputs from the first evaluation function and the second evaluation function is fuel consumption of the engine.

With this configuration, response characteristics are optimized through the repetition of interactive evaluation method in relation to the first evaluation function or second evaluation function, whichever undergoes the interactive evaluation while the fuel consumption of the engine is optimized through the repetition of autonomous evaluation method in relation to the first evaluation function or second evaluation function, whichever undergoes the autonomous evaluation.

In the algorithm-based optimizing controller, the optimizing algorithm comprises individuals information manipulation means which virtually generates a population consisting of a set of a plurality of individuals, generates individuals information about each of the individuals by likening it to genetic information, assigns said control coefficient to the individuals information, and performs information manipulations on the individuals information by imitating gene manipulations, evaluation value calculation means which calculates evaluation value of the individuals, and individuals selection means which screen the individuals based on the evaluation value calculated by the evaluation value calculation means; and the optimizing algorithm is an evolutionary optimizing algorithm which moves processing one generation ahead after going through at least one genetic manipulation by the individuals information manipulation means and one individuals selection by the individuals selection means.

With this configuration, the individuals information manipulation means performs information manipulations on the individuals information by imitating gene manipulations, the evaluation value calculation means calculates evaluation value, and the individuals selection means screen the individuals based on the calculated evaluation value. Processing moves one generation ahead after going through at least one genetic manipulation by the individuals information manipulation means and one individuals selection by the individuals selection means.

In the algorithm-based optimizing controller, the controlled object is an engine; and fuel injection quantity of the engine, a transient amount of correction for use to correct the fuel injection quantity in transient state of the engine, and a correction value to the fuel injection quantity or a correction value to the transient amount of correction are assigned to the individuals information as the control coefficients.

With this configuration, fuel injection quantity of the engine, a transient amount of correction, and a correction value to the fuel injection quantity or a correction value to the transient amount of correction are determined in such a way that high evaluation value can be expected as the population evolves.

In the algorithm-based optimizing controller, the controlled object is an engine; the fuel injection quantity of the engine, the transient amount of correction for use to correct the fuel injection quantity in transient state of the engine, and the correction value to the fuel injection quantity or the correction value to the transient amount of correction are generated by neural networks; and coupling coefficients of synapses in the neural networks are assigned to the individuals information as the control coefficients.

With this configuration, fuel injection quantity of the engine, a transient amount of correction, and a correction value to the fuel injection quantity or a correction value to the transient amount of correction are generated by neural networks and the coupling coefficients of synapses in the neural networks are determined in such a way that high evaluation value can be expected as the population evolves.

The algorithm-based optimizing controller, the controlled object is an electric motor; and what undergoes the interactive evaluation among the outputs from the first evaluation function and the second evaluation function is a speed change rate of the electric motor while what undergoes the autonomous evaluation among the outputs from the first evaluation function and the second evaluation function is power consumption of the electric motor.

With this configuration, the speed change characteristics of the electric motor is optimized through the repetition of interactive evaluation method in relation to the first evaluation function or second evaluation function, whichever undergoes the interactive evaluation while the power consumption characteristics of the engine is optimized through the repetition of autonomous evaluation method in relation to the first evaluation function or second evaluation function, whichever undergoes the autonomous evaluation.

On the other hand, to achieve the above object, the present invention provides an optimal solution search program which is a computer-executable program for optimizing control characteristics of a first control system for controlling a first characteristic of a controlled object and a second control system for controlling a second characteristic of the controlled object, by searching for an optimal solution of an evaluation function using an optimizing algorithm while repeatedly evaluating output from the evaluation function which receives input of control coefficients that affect control characteristics of the control system for controlling characteristics of the controlled object and outputs the control characteristics, characterized in that the program makes the computer: carry out searches based on the optimizing algorithm using a combination of interactive evaluation method evaluating the output from the evaluation function based on interaction with a user and autonomous evaluation method evaluating the output from the evaluation function based on predetermined evaluation criteria; search for an optimal solution of a first evaluation function, in the first control system, using the optimizing algorithm while repeatedly evaluating, by the interactive evaluation method, the output from the first evaluation function which receives input of control coefficients that affect control characteristics of the first control system and outputs the control characteristics; and search for an optimal solution of a second evaluation function, in the second control system, using the optimizing algorithm while repeatedly evaluating, by the autonomous evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

With this configuration, the program running on a computer has an effect equivalent to that of the optimal solution search device.

Furthermore, the present invention provides an optimal solution search program which is a computer-executable program for optimizing control characteristics of a first control system for controlling a first characteristic of a controlled object and a second control system for controlling a second characteristic of the controlled object, by searching for an optimal solution of an evaluation function using an optimizing algorithm while repeatedly evaluating output from the evaluation function which receives input of control coefficients that affect control characteristics of the control system for controlling characteristics of the controlled object and outputs the control characteristics, characterized in that the program makes the computer: carry out searches based on the optimizing algorithm using a combination of interactive evaluation method evaluating the output from the evaluation function based on interaction with a user and autonomous evaluation method evaluating the output from the evaluation function based on predetermined evaluation criteria; search for an optimal solution of a first evaluation function, in the first control system, using the optimizing algorithm while repeatedly evaluating, by the autonomous evaluation method, the output from the first evaluation function which receives input of control coefficients that affect control characteristics of the first control system and outputs the control characteristics; and search for an optimal solution of a second evaluation function, in the second control system, using the optimizing algorithm while repeatedly evaluating, by the interactive evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

With this configuration, the program running on a computer has an effect equivalent to that of the optimal solution search device.

BEST MODE FOR CARRYING OUT THE INVENTION

An embodiment of the present invention will be described below with reference to the drawings. FIGS. 1 to 12 are diagrams showing an optimal solution search device, algorithm-based optimizing controller, and optimal solution search program according to the present invention.

Figure 1:
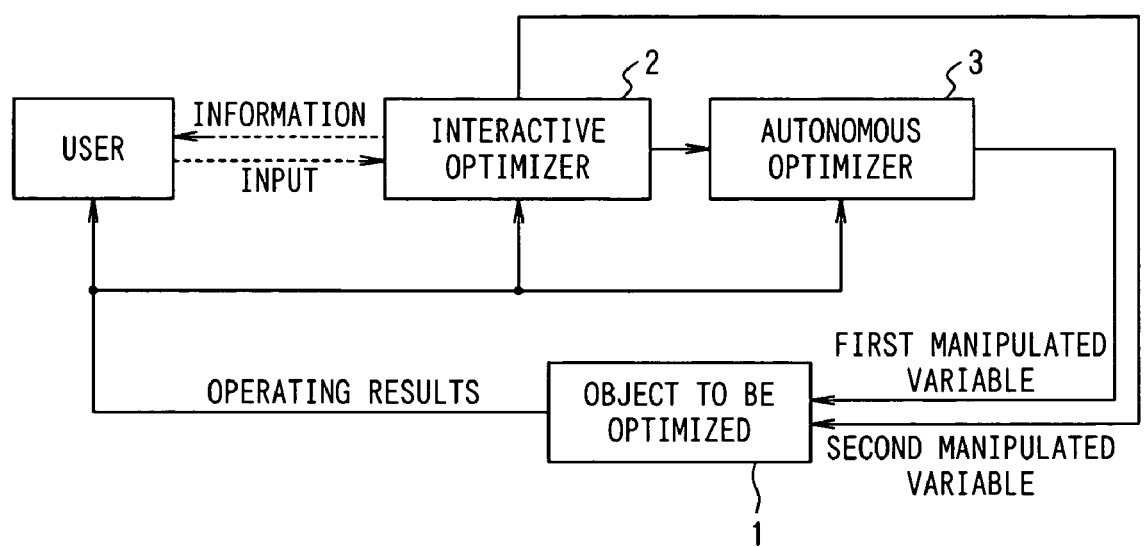
FIG. 1 is a diagram showing a basic concept of the present invention.

First, a basic concept of the present invention will be described with reference to FIG. 1. FIG. 1 is a diagram showing the basic concept of the present invention.

In its basic configuration, the present invention comprises an object to be optimized 1, an interactive optimizer 2 which determines a first manipulated variable of the object to be optimized 1 by an evolutionary optimizing algorithm and outputs it while evaluating the object to be optimized 1 by interactive evaluation method, and an autonomous optimizer 3 which determines a second manipulated variable of the object to be optimized 1 by the evolutionary optimizing algorithm and outputs it while evaluating the object to be optimized 1 by autonomous evaluation method, as shown in FIG. 1.

The interactive optimizer 2 determines the first manipulated variable by GA so as to optimize operating characteristics of the object to be optimized 1 based on operating results of the object to be optimized 1 and outputs the determined first manipulated variable to the object to be optimized 1.

The autonomous optimizer 3 determines the second manipulated variable by the GA so as to optimize operating characteristics of the object to be optimized 1 based on operating results of the object to be optimized 1 and outputs the determined second manipulated variable to the object to be optimized 1.

Figure 2:
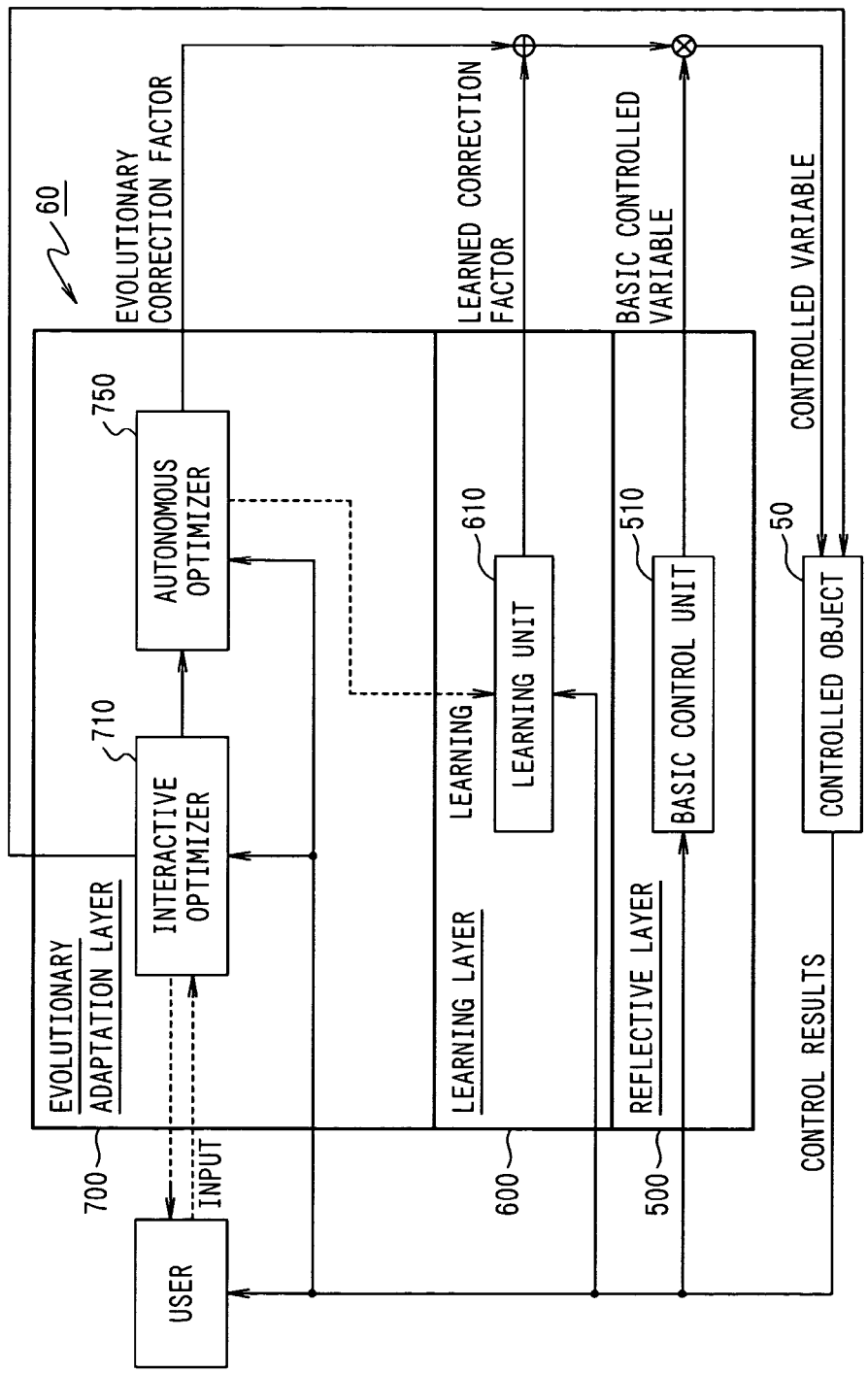
FIG. 2 is a block diagram showing a basic configuration of the present invention.

Next, a basic configuration of the present invention will be described with reference to FIG. 2. FIG. 2 is a block diagram showing the basic configuration of the present invention.

In its basic configuration, the present invention comprises a controlled object 50 and a controller 60 which controls a controlled variable of the controlled object 50 based on control results of the controlled object 50, as shown in FIG. 2.

The controller 60 consists of three control layers: a reflective layer 500, learning layer 600, and evolutionary adaptation layer 700. It receives control results from the controlled object 50, determines a basic controlled variable in the reflective layer 500 and determines a correction factor for the basic controlled variable in the learning layer 600 and evolutionary adaptation layer 700 based on the received control results, and then determines a final controlled variable based on the basic controlled variable and correction factor. Configurations of the reflective layer 500, learning layer 600, and evolutionary adaptation layer 700 will be described in detail below.

The reflective layer 500 comprises a basic control unit 510 which defines relationship between the basic controlled variable and control results using formulas, maps, neural networks, fuzzy rules, subsumption architecture, etc. The basic control unit 510 receives control results from the controlled object 50 and determines and outputs the basic controlled variable based on the received control results.

Incidentally, the subsumption architecture is known as behavior-based artificial intelligence which performs parallel processing.

The evolutionary adaptation layer 700 consists of an interactive optimizer 710 which optimizes the control characteristics of the controlled object 50 by repeating evaluation performed by interactive evaluation method using the evolutionary optimizing algorithm and an autonomous optimizer 750 which optimizes the control characteristics of the controlled object 50 by repeating evaluation performed by autonomous evaluation method.

The interactive optimizer 710 has at least one control module which outputs a controlled variable of the controlled object 50 based on control results. It is configured to optimize the control module using GA by repeating evaluation performed by interactive evaluation method which consists in evaluating the control characteristics of the controlled object 50 based on interaction with the user. The GA virtually generates a population consisting of a set of a plurality of individuals and prepares individuals information about each of the individuals by likening it to genetic information. Control coefficients for constructing the control module are assigned to the individuals information. The population evolves as processing moves a predetermined number of generations ahead after going through at least one genetic manipulation which consists in performing information manipulation on the individuals information by imitating a gene manipulation and one individuals selection which is made to screen the individuals based on evaluation value of the individuals. Hereinafter, a control module built on the individuals information about the individual that has the highest evaluation value will be referred to as an "optimal control module." Incidentally, a control module is a unit for performing a group of control operations in a control system.

The autonomous optimizer 750 has at least one control module which outputs an evolutionary correction factor for correcting the basic controlled variable received from the reflective layer 500 in line with user requirements based on control results. It is configured to optimize the control module using the GA. After constructing an optimal control module, the autonomous optimizer 750 establishes the optimal control module as its control module, performs control using the evolutionary correction factor for correcting the basic controlled variable received from the reflective layer 500, and makes the learning layer 600 learn information about the optimal control module. When the learning layer 600 has learned information about the optimal control module, the autonomous optimizer 750 returns its output to "1" and subsequently operates according to instructions from the user. Thus, the control module of the autonomous optimizer 750 performs control only during an evolution simulation and during learning.

The learning layer 600 comprises a learning unit 610 which has two neural networks switchable between learning and control. The learning unit 610 learns from the evolutionary adaptation layer 700 the relationship between input and output of the optimal control module using one of the neural networks (learning) while performing control with the other neural network (controlling). When the learning neural network finishes learning, the learning neural network and the controlling neural network change their places: the neural network which finished learning starts control using the control module obtained by learning and the neural network which was performing control starts to function as a learning neural network. The neural networks in the learning layer 600 are set to output "1" in initial state.

Therefore, in initial state, control is performed by the reflective layer 500 and evolutionary adaptation layer 700.

The controlling neural network is configured to receive control results from the controlled object 50 and output a learned correction factor for correcting the basic controlled variable received from the reflective layer 500, based on the received control results. This configuration applies similarly to the controlling neural network.

The controller 60 calculates the controlled variable by adding the learned correction factor received from the learning layer 600 and the evolutionary correction factor received from the evolutionary adaptation layer 700 and multiplying the basic controlled variable received from the reflective layer 500 by the sum. Then, the controller 60 outputs the calculated controlled variable to the controlled object 50.

A more concrete embodiment of the present invention will be described below.

Figure 3:
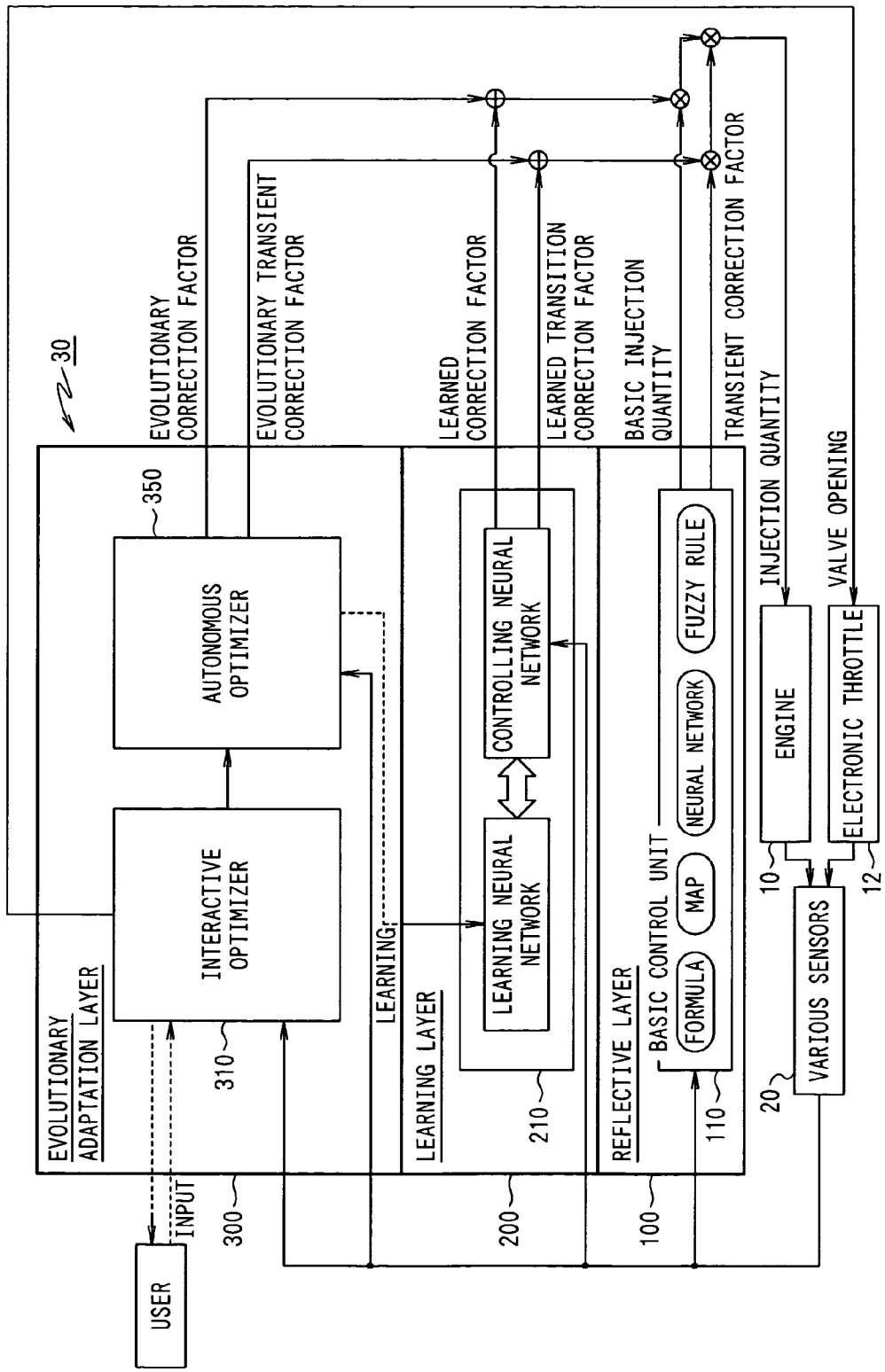
FIG. 3 is a block diagram showing a configuration of an engine control system to which the present invention is applied.

This embodiment applies the optimal solution search device, algorithm-based optimizing controller, and optimal solution search program according to the present invention to a case in which a combination of interactive evaluation method and autonomous evaluation method is repeated using GA to optimize fuel consumption characteristics and response characteristics of an engine 10 for the user as shown in FIG. 3.

First, a configuration of an engine control system to which the present invention is applied will be described with reference to FIG. 3. FIG. 3 is a block diagram showing the configuration of the engine control system to which the present invention is applied.

As shown in FIG. 3, the engine control system comprises the engine 10, an electronic throttle 12 which regulates the amount of intake air to cylinders, various sensors 20 which detect operating conditions of the engine 10 and electronic throttle 12 and output various information (hereinafter referred collectively as operation information) about operating conditions of the engine 10, and a controller 30 which controls the fuel injection quantity of the engine 10 based on operation information from the various sensors 20.

The various sensors 20 detect the operating conditions of the engine 10 and electronic throttle 12 and driving state of the vehicle and output the rotational speed of the engine 10, throttle opening, rate of change in throttle opening, distance pulse, and fuel injection quantity as operation information, based on the detection results.

The controller 30 consists of three control layers: a reflective layer 100, learning layer 200, and evolutionary adaptation layer 300. It receives the operation information from the various sensors 20, determines a basic injection quantity in the reflective layer 100 and determines a correction factor for the basic injection quantity in the learning layer 200 and evolutionary adaptation layer 300 based on the received operation information, and then determines final fuel injection quantity based on the basic injection quantity and correction factor. Configuration of the reflective layer 100, learning layer 200, and evolutionary adaptation layer 300 will be described in detail below.

The reflective layer 100 comprises a basic control unit 110 which defines relationship of the basic injection quantity and a transient correction factor with the operation information using formulas, maps, neural networks, fuzzy rules, subsumption architecture, etc. The basic control unit 110 receives operation information from the various sensors 20 and determines and outputs the basic injection quantity and transient correction factor based on the received operation information.

The evolutionary adaptation layer 300 consists of an interactive optimizer 310 which optimizes the control characteristics (response characteristics) of the electronic throttle 12 by repeating evaluation performed by interactive evaluation method using the GA and an autonomous optimizer 350 which optimizes the control characteristics of the engine 10 by repeating evaluation performed by autonomous evaluation method.

The interactive optimizer 310 has at least one control module which outputs valve opening of the electronic throttle 12 based on the operation information. It is configured to optimize the control module using the GA by repeating evaluation performed by interactive evaluation method which consists in evaluating the responsivity based on interaction with the user.

The autonomous optimizer 350 has at least one control module which outputs correction factors (hereinafter, the correction factor for correcting the basic injection quantity will be referred to as an evolutionary correction factor while the correction factor for correcting the transient correction factor will be referred to as an evolutionary transient correction factor) for correcting the basic injection quantity and transient correction factor received from the reflective layer 100 in line with user requirements based on the operation information. It is configured to optimize the control module using the GA. After constructing an optimal control module, the autonomous optimizer 350 establishes the optimal control module as its control module, performs control using the evolutionary correction factor for correcting the basic injection quantity received from the reflective layer 100 and the evolutionary transient correction factor for correcting the transient correction factor received from the reflective layer 100, and makes the learning layer 200 learn information about the optimal control module. When the learning layer 200 has learned information about the optimal control module, the autonomous optimizer 350 returns its output to "1" and subsequently operates according to instructions from the user. Thus, the control module of the autonomous optimizer 350 performs control only during an evolution simulation and during learning.

The learning layer 200 comprises a learning unit 210 which has two neural networks switchable between learning and control. The learning unit 210 learns from the evolutionary adaptation layer 300 the relationship between input and output of the optimal control module using one of the neural networks (learning) while performing control with the other neural network (controlling). When the learning neural network finishes learning, the learning neural network and the controlling neural network change their places: the neural network which finished learning starts control using the control module obtained by learning and the neural network which was performing control starts to function as a learning neural network. The neural networks in the learning layer 200 are set to output "1" in initial state. Therefore, in initial state, control is performed by the reflective layer 100 and evolutionary adaptation layer 300.

The controlling neural network further comprises two neural networks although not shown particularly. One of them is configured to receive throttle opening and engine speed as operation information from the various sensors 20 and output the correction factor (hereinafter this correction factor will be referred to as a learned correction factor) for correcting the basic injection quantity received from the reflective layer 100 based on the received information. The other neural network is configured to receive the rate of change in the throttle opening and the engine speed as operation information from the various sensors 20 and output the correction factor (hereinafter this correction factor will be referred to as a learned transient correction factor) for correcting the transient correction factor received from the reflective layer 100 based on the received information. This configuration applies similarly to the learning neural network.

The controller 30 produces a first product by adding the learned correction factor received from the learning layer 200 and the evolutionary correction factor received from the evolutionary adaptation layer 300 and multiplying the basic injection quantity received from the reflective layer 100 by the sum. Also, it produces a second product by adding the learned transient correction factor received from the learning layer 200 and the evolutionary transient correction factor received from the evolutionary adaptation layer 300 and multiplying the transient correction factor received from the reflective layer 100 by the sum. Then, it calculates the fuel injection quantity by multiplying the first product by the second product, and outputs the calculated fuel injection quantity to the engine 10.

Figure 4:
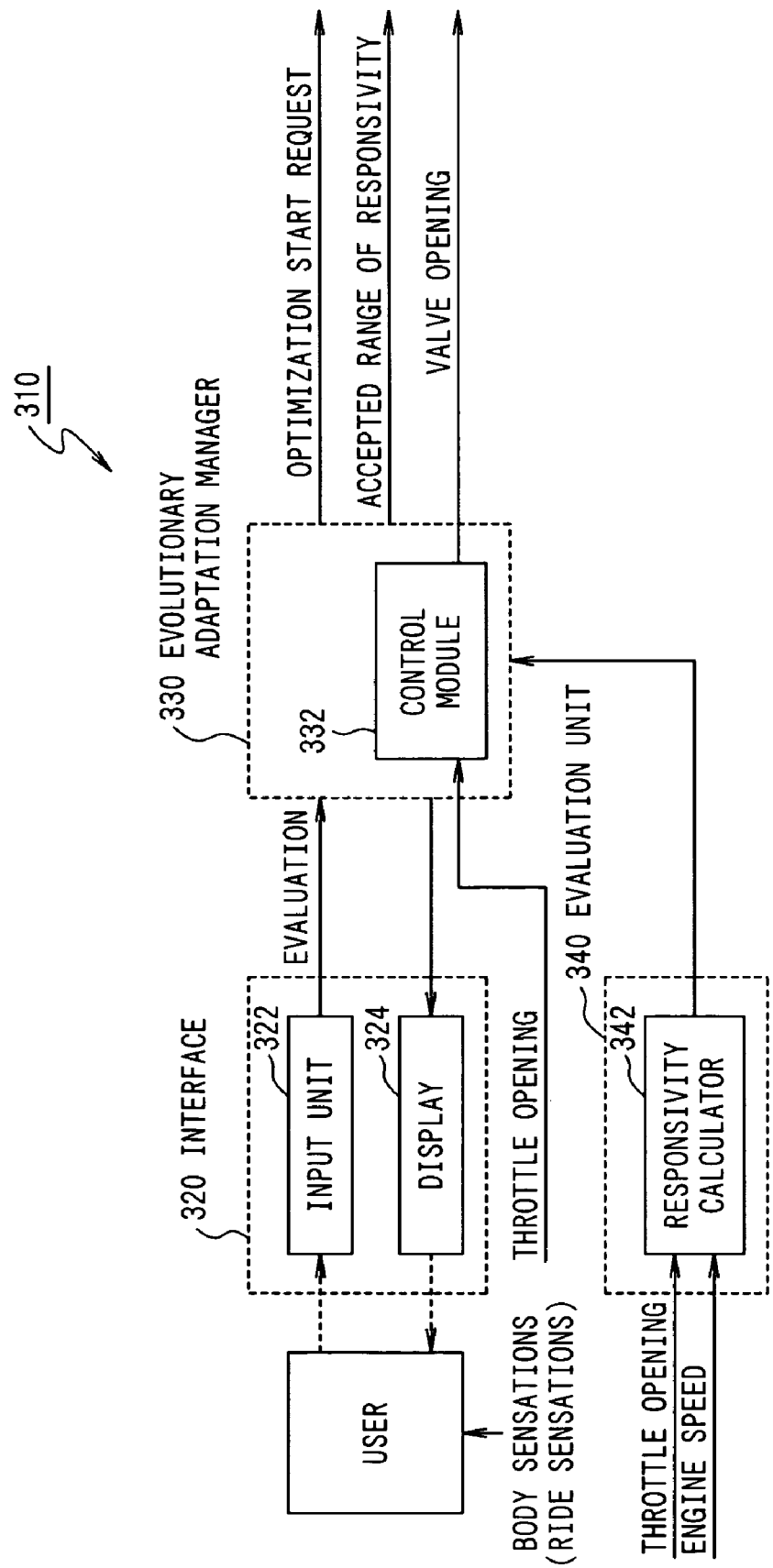
FIG. 4 is a block diagram showing a configuration of an interactive optimizer 310.

Next, configuration of the interactive optimizer 310 will be described with reference to FIG. 4. FIG. 4 is a block diagram showing the configuration of the interactive optimizer 310.

As shown in FIG. 4, the interactive optimizer 310 comprises an interface 320 which handles input and output from/to the user, evolutionary adaptation manager 330 which optimizes the control characteristics of the engine 10 by conducting a GA-based evolution simulation, and evaluation unit 340 which calculates GA's evaluation value of individuals.

The interface 320 comprises a display 324 which displays the evaluation value of individuals during evolution simulations and an input unit 322 which allows the user to enter evaluation. During evolution simulations using the GA, the display 324 displays the evaluation value (responsivity described later) of individuals in each generation and the user enters an evaluation through the input unit 322 based on body sensations such as ride sensations.

The evaluation unit 340 consists of a responsivity calculator 342 which calculates responsivity based on operation information. The responsivity calculator 342 receives the throttle opening and engine speed as the operation information, calculates the rate of change in the engine speed and the rate of change in the throttle opening, calculates responsivity by dividing the rate of change in the engine speed by the rate of change in the throttle opening, and outputs the calculated responsivity as the GA's evaluation value of individuals to the evolutionary adaptation manager 330.

The evolutionary adaptation manager 330 has a control module 332. The control module 332 defines relationship between throttle opening and valve opening based on two control coefficients $SP_1$, and $SP_2$ which represent static characteristics of the throttle opening and valve opening as well as on two control coefficients DR (first-order lag element) and AG (inexact differential element) which represent dynamic characteristics of the throttle opening and valve opening, receives the throttle opening as operation information, determines the valve opening based on the received throttle opening, and outputs it to the electronic throttle 12.

Figure 5:
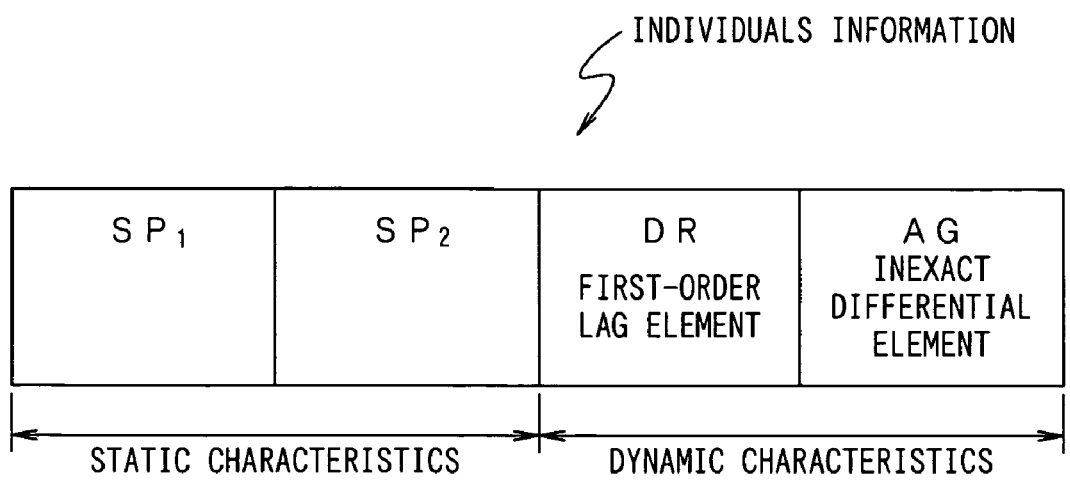
FIG. 5 is a diagram showing a data structure of individuals information.

The two control coefficients $SP_1$, and $SP_2$ which represent static characteristics and two control coefficients DR and AG which represent dynamic characteristics are assigned to GA's individuals information about individuals. Specifically, they are assigned as shown in FIG. 5. FIG. 5 is a diagram showing a data structure of the individuals information.

The GA's individuals information about individuals contains the two control coefficients $SP_1$, and $SP_2$ in high order part to represent static characteristics, and two control coefficients DR and AG in low order part to represent dynamic characteristics. For example, if one control coefficient consists of 16 bits of data, the individuals information contains 64 bits of data in total. Random numbers are used as initial individuals information generated for each individual when starting an evolution simulation. To ensure responsivity to a certain extent, it is desirable to limit the range of random numbers. In other words, random numbers should not be generated in such ranges where the responsivity would be degraded.

Figure 6:
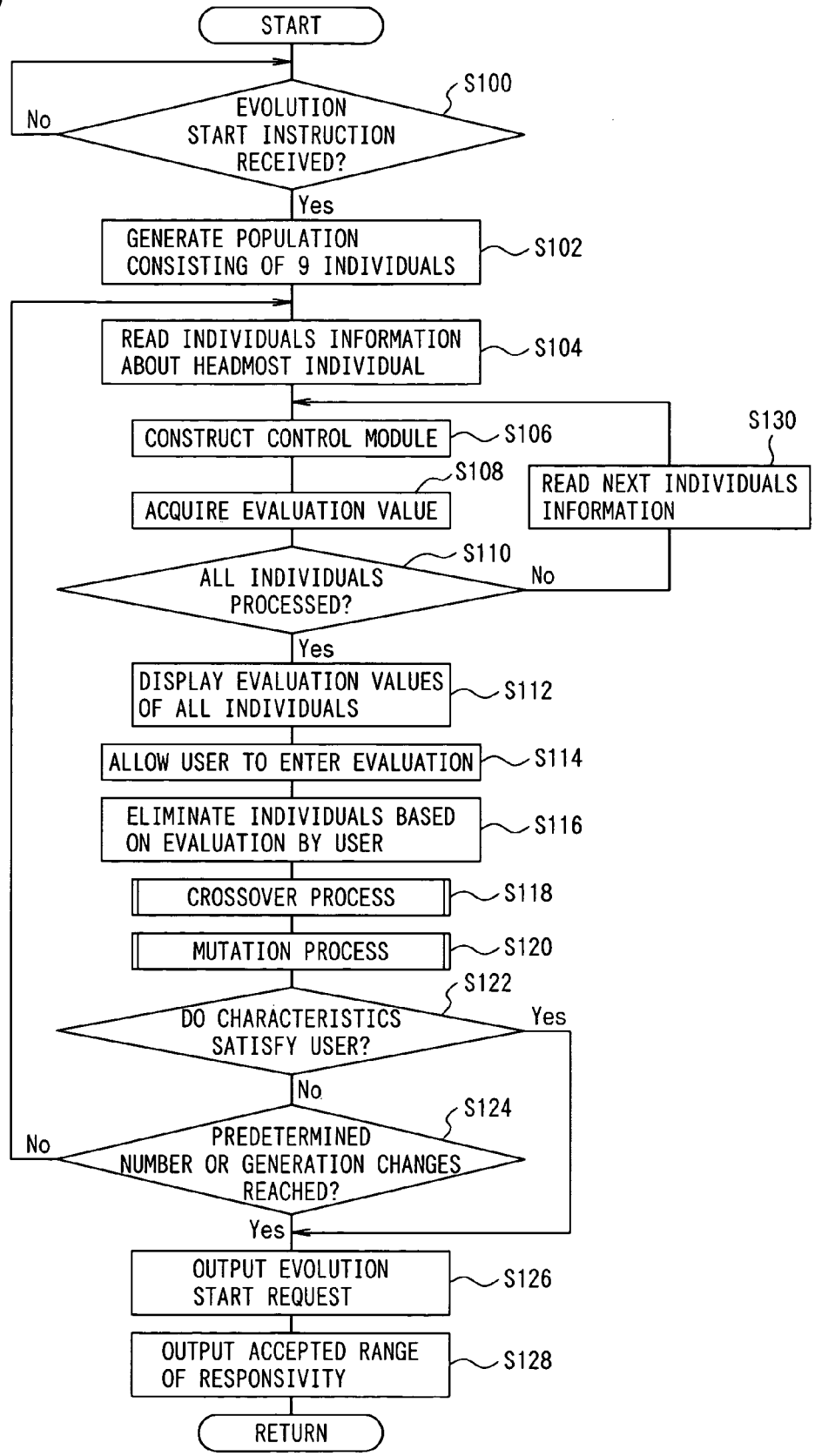
FIG. 6 is a flowchart of processes performed by an evolutionary adaptation manager 330.

Next, processes carried out by the evolutionary adaptation manager 330 will be described in detail with reference to FIG. 6. FIG. 6 is a flowchart of processes performed by the evolutionary adaptation manager 330.

The GA gives random initial values to each individual and arranges the individuals in search spaces, applies genetic manipulations known as crossover and mutation to each generation, propagate or select the individuals according to evaluation value of the individuals, and thereby obtains a set of individuals of the next generation. The GA is intended to approach an optimal solution asymptotically by repeating such generation changes. Now, crossover, mutation, and selection which are genetic manipulations will be described below.

Crossover is a manipulation which involves designating at least two individuals as parents, changing part of the individuals information about the parent individuals, and thereby generating one or more individuals that will become descendants. By combining better part of the individuals information on one individual and better part of the individuals information on another individual, it will be possible to obtain an individual with a higher evaluation value. For example, when generating two descendants by using two individuals as parents, if the individuals information on one of the parent individuals is "000110" and the individuals information on the other parent individual is "110111," by crossing over the two at the third place, it is possible to obtain a descendant that has individuals information "000111" and a descendant that has individuals information "110110."

A mutation is a manipulation which changes a specific part of individuals information about individuals at a predetermined probability. It increases variety within the population. Specifically, this manipulation inverts a specific bit in individuals information. For example, if the individuals information about a certain individual is "000111" and a mutation occurs on the third digit, an individual with individuals information "001111" is obtained.

Selection is a manipulation which preserves better individuals in a population for the next generation according to the evaluation value of individuals. According to a selection method known as roulette selection, each individual is selected at a probability proportional to its evaluation value. For example, if the evaluation value of individuals with individuals information "000000," "111011," "110111," "010111" are "8," "4," "2," and "2," respectively, the probabilities that these individuals will be selected are "8/16," "4/16," "2/16," and "2/16," respectively. Thus, on average, in this population, the number of individuals with the individuals information "000000" will increase to two, the number of individuals with the individuals information "111011"

will remain at one, and either the individual with the individuals information "110111" or the individual with the individuals information "010111" will remain in the next generation. However, the evolutionary adaptation manager 330 selects individuals based on user selections.

With the above in mind, the processes carried out by the evolutionary adaptation manager 330 will be described. The processes shown in the flowchart of FIG. 6 are executed by a CPU according to a program, for example, read out of a ROM.

First, the evolutionary adaptation manager 330 goes to Step S100, where it judges whether an evolution start instruction, which is an instruction to start an evolution simulation, is received from the input unit 322. If it is judged that an evolution start instruction is received (Yes), the evolutionary adaptation manager 330 goes to Step S102. Otherwise (No), the evolutionary adaptation manager 330 waits at Step S100 until an evolution start instruction is received.

In Step S102, the evolutionary adaptation manager 330 virtually generates a population consisting of a set of a predetermined number (e.g., nine) of individuals and prepares individuals information about each of the individuals. In this case, the two control coefficients $SP_1$, and $SP_2$ which represent static characteristics and two control coefficients DR and AG which represent dynamic characteristics are assigned to the individuals information on each individual. Random numbers are used for the individuals information on each individual. By generating one individual with all the digits in its individuals information set to "0," it is possible to keep response performance during the evolution process above the level before the evolution. Incidentally, the individuals information about each individual is stored and managed in a storage unit such as a RAM.

Next, the evolutionary adaptation manager 330 goes to Step S104, where it reads the individuals information about the headmost individual. Then, the evolutionary adaptation manager 330 goes to Step S106, where it constructs a control module 332 based on the individuals information read out and starts controlling the electronic throttle 12 using the constructed control module 332.

Next, the evolutionary adaptation manager 330 goes to Step S108, where it acquires responsivity from the evaluation unit 340. It constructs a control module 332 based on the individuals information and starts controlling the electronic throttle 12 using the constructed control module 332. The evolutionary adaptation manager 330 uses the acquired responsivity as an evaluation value of the individual. The higher the evaluation value, the more excellent the individual can be regarded as in the GA-based evolution simulation.

Next, the evolutionary adaptation manager 330 goes to Step S110, where it judges whether all the individuals in the population have gone through Steps S106 to S108. If it is judged that all the individuals have gone through the steps (Yes), the evolutionary adaptation manager 330 goes to Step S112.

In Step S112, the evolutionary adaptation manager 330 displays the responsivity of each individual as its evaluation value on the display 324. The evolutionary adaptation manager 330 goes to Step S114, where it allows the user to enter evaluation via the input unit 322. When the evaluations of all the individuals in the population have been displayed, control enters an evaluation mode. In the evaluation mode, when the user selects individuals with desired characteristics by looking at the evaluation displayed on the display 324, the evolutionary adaptation manager 330 constructs a control module 332 based on the individuals information about the individual selected by the user, establishes it temporarily, and performs control using the constructed control module 332. This allows the user to evaluate each individual displayed on the display 324 by comparing its characteristics with ride sensations during driving. After evaluating the individuals based on the evaluation on the display 324 and ride sensations during driving, the user switches control to a screening mode to screen the individuals in the population in Step S116. To screen the individuals in the population, the user switches to the screening mode in the input unit 322, selects individuals with desired characteristics from the population with reference to the display screen, and erases the other individuals leaving the selected individuals.

Next, the evolutionary adaptation manager 330 goes to Step S1118, where it performs a crossover process to cross over individuals based on the GA. Specifically, in Step S118, the evolutionary adaptation manager 330 selects two parent individuals, by using random numbers, from among the individuals selected by the user, and then generates two child individuals by crossing over the parents individuals. By repeating this process five times, the evolutionary adaptation manager 330 generates a population consisting of nine child individuals (the tenth child individual is discarded). Besides the one-point crossover process described above, a two-point crossover process or normally distributed crossover process may be used, for example. The normally distributed crossover process is the process of generating child individuals according to a normal distribution rotationally symmetric with respect to an axis joining parents individuals using individuals information expressed in real numbers. Regarding the standard deviation of the normal distribution, the component along the main axis joining the parents individuals is proportional to the distance between the parents individuals while the component along another axis is proportional to the distance between a straight line joining the parents individuals and a third parent individual sampled from the population. This crossover method has the advantage that properties of parents are readily inherited by child individuals.

Next, the evolutionary adaptation manager 330 goes to Step S120, where it performs a mutation process to cause mutations to individuals based on the GA. Then, it goes to Step S122, where it judges, based on information from the input unit 322, whether characteristics satisfactory to the user have been obtained. If it is judged that characteristics satisfactory to the user have not been obtained (No), the evolutionary adaptation manager 330 goes to Step S124 and judges whether the number of generation changes has reached a predetermined number. If it is judged that the predetermined number has been reached (Yes), the evolutionary adaptation manager 330 goes to Step S126.

In Step S126, the evolutionary adaptation manager 330 outputs an evolution start request to the autonomous optimizer 350 to start an evolution simulation. Then, the evolutionary adaptation manager 330 goes to Step S128, where it extracts the individual with the highest evaluation value from the population and using the evaluation value of the extracted individual as responsivity, it outputs a predetermined range around the responsivity as an accepted range of the responsivity to the autonomous optimizer 350. This ends the sequence of processes and the evolutionary adaptation manager 330 returns to the original process.

On the other hand, if it is judged in Step S124 that the number of generation changes is less than the predetermined number (No), the evolutionary adaptation manager 330 goes to Step S104.

On the other hand, if it is judged in Step S122 that characteristics satisfactory to the user have been obtained (Yes), the evolutionary adaptation manager 330 goes to Step S126.

On the other hand, if it is judged in Step S10 that not all the individuals in the population have gone through the Steps S106 to S108 (No), the evolutionary adaptation manager 330 goes to Step S130, where it reads the individuals information about the next individual in the population. Then, it goes to Step S106.

Figure 7:
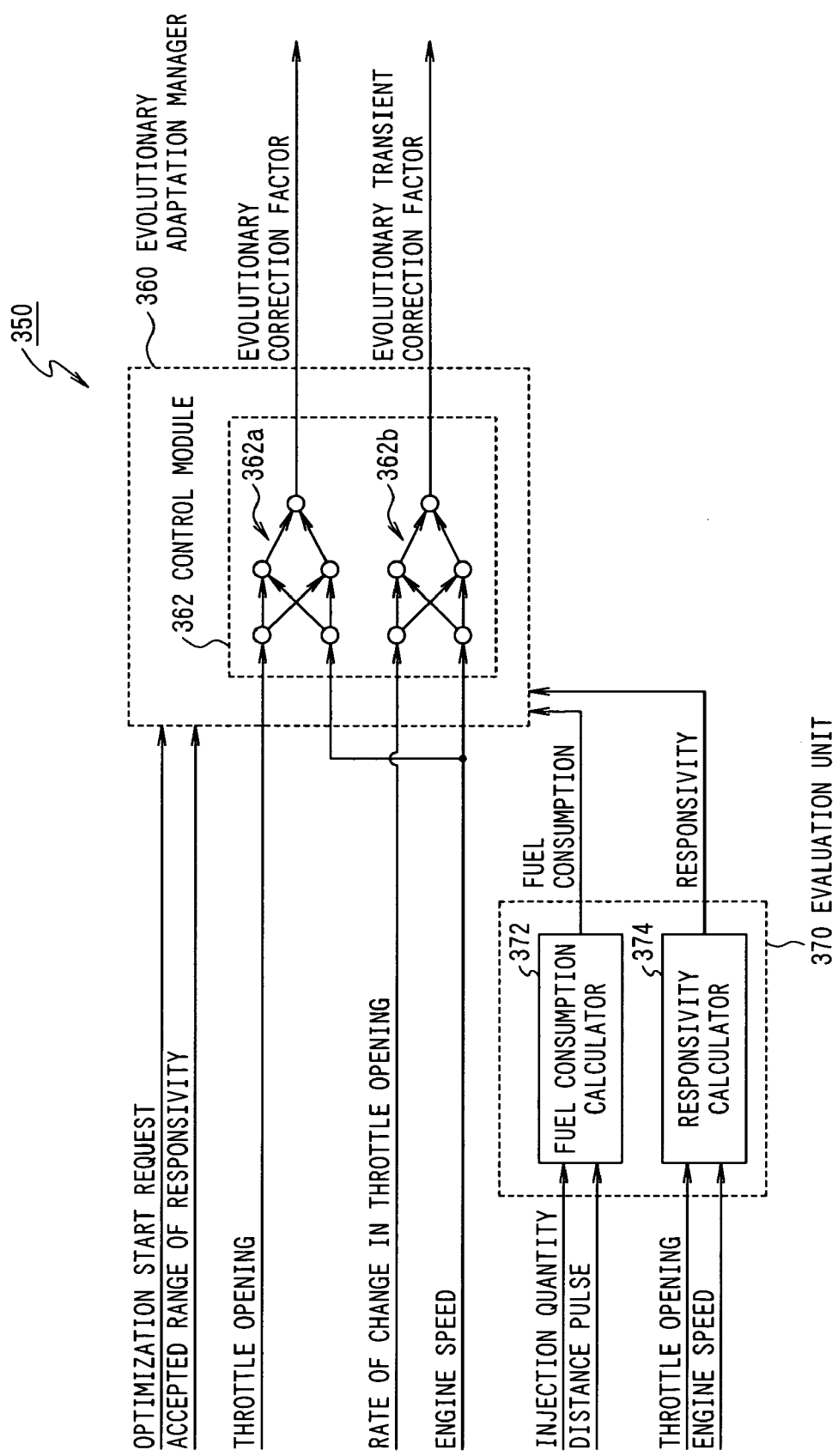
FIG. 7 is a block diagram showing a configuration of an autonomous optimizer 350.

Next, a configuration of the autonomous optimizer 350 will be described with reference to FIG. 7. FIG. 7 is a block diagram showing the configuration of the autonomous optimizer 350.

As shown in FIG. 7, the autonomous optimizer 350 comprises an evolutionary adaptation manager 360 which optimizes the control characteristics of the engine 10 by conducting a GA-based evolution simulation, and evaluation unit 370 which calculates GA's evaluation value of individuals.

The evaluation unit 370 comprises a fuel consumption calculator 372 which calculates the fuel consumption of the engine 10 based on fuel injection quantity and distance pulses, and responsivity calculator 374 which calculates responsivity based on throttle opening and engine speed.

The fuel consumption calculator 372 receives the fuel injection quantity and distance pulses as operation information and calculates the fuel consumption by adding injection quantity each time a distance pulse is input, i.e., every predetermined distance of driving, and outputs the calculated fuel consumption to the evolutionary adaptation manager 360 as a GA's first evaluation value of individuals. The responsivity calculator 374 receives the throttle opening and engine speed as operation information, calculates the rate of change in the engine speed and the rate of change in the throttle opening, calculates responsivity by dividing the rate of change in the engine speed by the rate of change in the throttle opening, and outputs the calculated responsivity as a GA's second evaluation value of individuals to the evolutionary adaptation manager 360.

The evolutionary adaptation manager 360 comprises a control module 362. The control module 362 comprises two neural networks. One of the neural networks 362a is configured to receive throttle opening and engine speed as operation information from the various sensors 20 and output an evolutionary correction factor based on the received information. The other neural network 362b is configured to receive the rate of change in the throttle opening and the engine speed as operation information from the various sensors 20 and output an evolutionary transient correction factor based on the received information.

Figure 8:
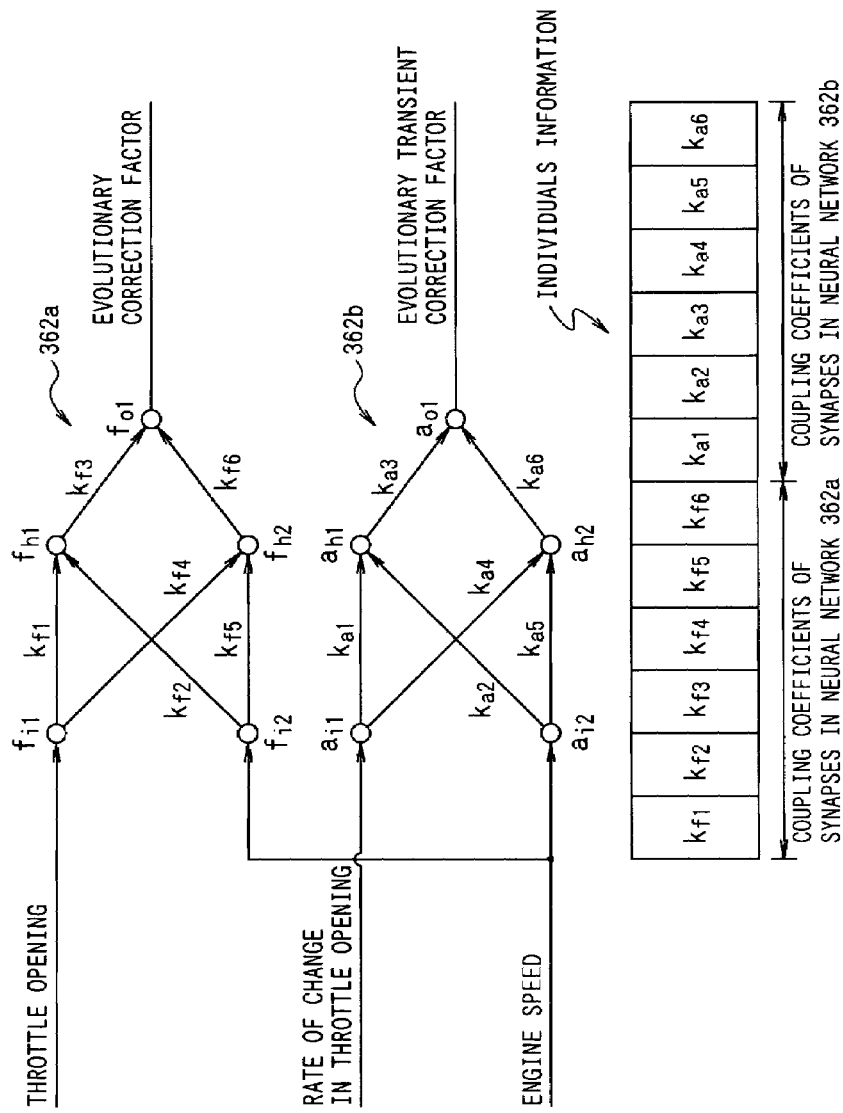
FIG. 8 is a diagram showing configurations of neural networks 362a and 362b and a data structure of individuals information.

Coupling coefficients of synapses in the neural networks 362a and 362b are assigned to the GA's individuals information about individuals. Specifically, it is assigned as shown in FIG. 8. FIG. 8 is a diagram showing configurations of the neural networks 362a and 362b and a data structure of individuals information.

The neural network 362a consists of five perceptrons: an input layer $f_{i1}$ which receives throttle opening, an input layer $f_{i2}$ which receives engine speed, intermediate layers $f_{n1}$ and $f_{n2}$ which receive outputs of the input layers $f_{i1}$ and $f_{i2}$, an output layer $f_{o1}$ which receives outputs of the intermediate layers $f_{n1}$ and $f_{n2}$ and outputs an evolutionary correction factor. The input layer $f_{i1}$ and intermediate layer $f_{n1}$ are coupled by a synapse with a coupling coefficient $k_{f1}$, the input layer $f_{i2}$ and intermediate layer $f_{n1}$ are coupled by a synapse with a coupling coefficient $k_{f2}$, the intermediate layer $f_{h1}$, and output layer $f_{o1}$ are coupled by a synapse with a coupling coefficient $k_{f3}$, the input layer $f_{i1}$ and intermediate layer $f_{h2}$ are coupled by a synapse with a coupling coefficient $k_{f4}$, the input layer $f_{i2}$ and intermediate layer $f_{h2}$ are coupled by a synapse with a coupling coefficient $k_{f5}$, and the intermediate layer $f_{h2}$ and output layer $f_{o2}$ are coupled by a synapse with a coupling coefficient $k_{f6}$.

The neural network 362b consists of five perceptrons: an input layer $a_{i1}$ which receives throttle opening, an input layer $a_{i2}$ which receives engine speed, intermediate layers $a_{h1}$ and $a_{h2}$ which receive outputs of the input layers $a_{i1}$ and $a_{i2}$, an output layer $a_{o1}$ which receives outputs of the intermediate layers $a_{h1}$, and $a_{h2}$ and outputs an evolutionary transient correction factor. The input layer $a_{i1}$ and intermediate layer $a_{h1}$, are coupled by a synapse with a coupling coefficient $k_{a1}$, the input layer $a_{i2}$ and intermediate layer $a_{h1}$, are coupled by a synapse with a coupling coefficient $k_{a2}$, the intermediate layer $a_{h1}$, and output layer $a_{o1}$, are coupled by a synapse with a coupling coefficient $k_{a3}$ the input layer $a_{i1}$ and intermediate layer $a_{h2}$ are coupled by a synapse with a coupling coefficient $k_{a4}$, the input layer $a_{i2}$ and intermediate layer $a_{h2}$ are coupled by a synapse with a coupling coefficient $k_{a5}$, and the intermediate layer $a_{h2}$ and output layer $a_{o2}$ are coupled by a synapse with a coupling coefficient $k_{a6}$.

The GA's individuals information about individuals contains the coupling coefficients $k_{f1}$ to $k_{f6}$ of synapses in high order part and the coupling coefficients $k_{a1}$ to $k_{a6}$ of synapses in low order part. For example, if one coupling coefficient consists of 8 bits of data, the individuals information contains 96 bits of data in total. Random numbers are used as initial individuals information generated for each individual when starting an evolution simulation. To ensure responsivity to a certain extent, it is desirable to limit the range of random numbers. In other words, random numbers should not be generated in such ranges where the responsivity would be degraded.

Figure 9:
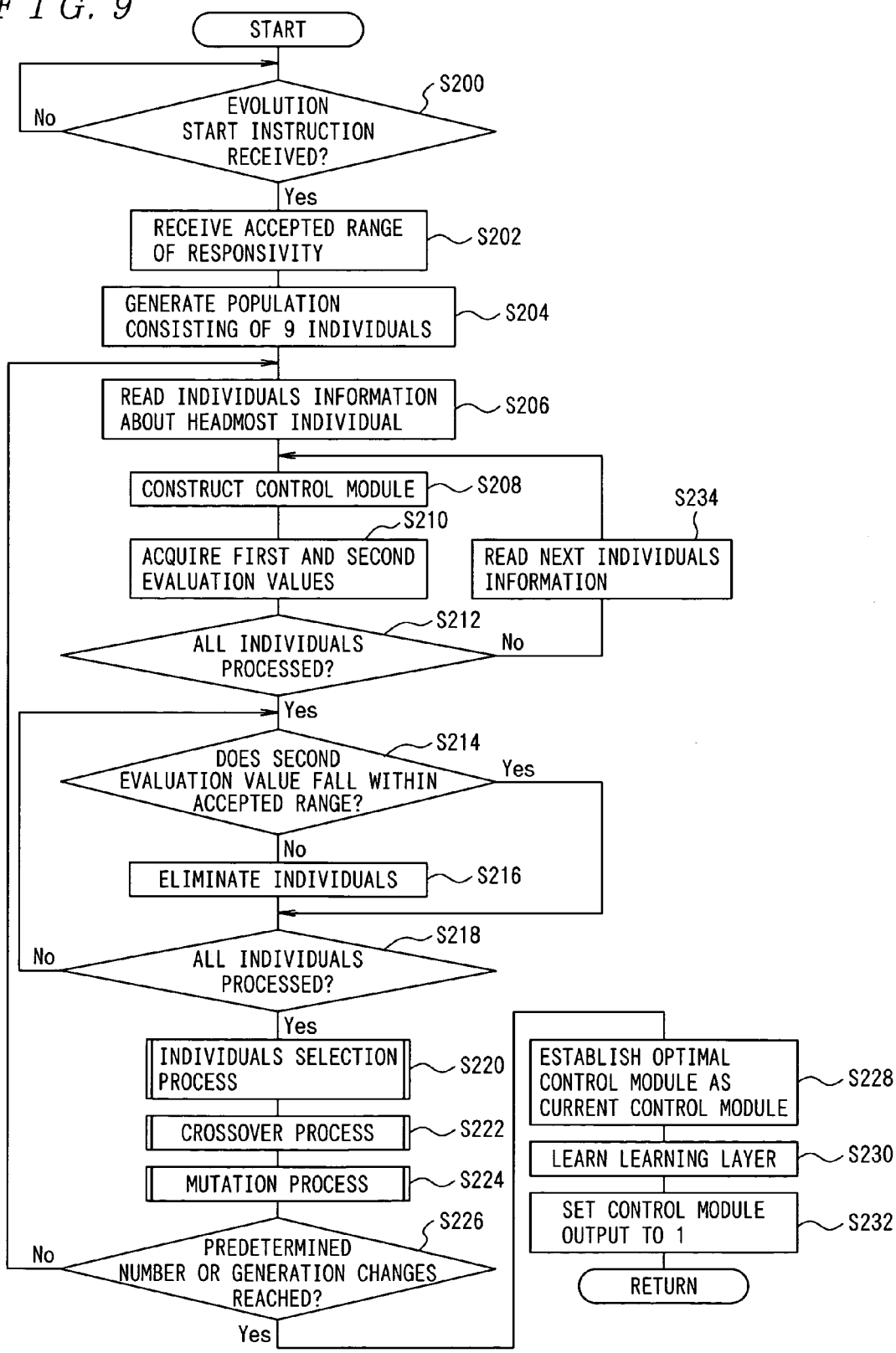
FIG. 9 is a flowchart of processes performed by an evolutionary adaptation manager 360.

Next, processes carried out by the evolutionary adaptation manager 360 will be described in detail with reference to FIG. 9. FIG. 9 is a flowchart of processes performed by the evolutionary adaptation manager 360. The processes shown in the flowchart of FIG. 9 are executed by a CPU according to a program, for example, read out of a ROM.

First, the evolutionary adaptation manager 360 goes to Step S200, where it judges whether an evolution start request is received from the interactive optimizer 310. If it is judged that an evolution start request is received (Yes), the evolutionary adaptation manager 360 goes to Step S202. Otherwise (No), the evolutionary adaptation manager 360 waits at Step S200 until an evolution start request is entered.

In Step S202, the evolutionary adaptation manager 360 receives the accepted range of responsivity from the interactive optimizer 310. Then, it goes to Step S204, where it virtually generates a population consisting of a set of a predetermined number (e.g., nine) of individuals and prepares individuals information about each of the individuals. Coupling coefficients of synapses in the neural networks 362a and 362b are assigned to the individuals information. Random numbers are used for the individuals information on each individual. By generating one individual with all the digits in its individuals information set to "0," it is possible to keep response performance during the evolution process above the level before the evolution. Incidentally, the individuals information about each individual is stored and managed in a storage unit such as a RAM.

Next, the evolutionary adaptation manager 360 goes to Step S206, where it reads the individuals information about the headmost individual. Then, the evolutionary adaptation manager 360 goes to Step S208, where it constructs a control module 362 by determining connections in the neural networks 362a and 362b based on the individuals information read out and starts controlling the engine 10 using the constructed control module 362. In so doing, the evolutionary adaptation manager 360 inputs the throttle opening, the rate of change in the throttle opening and engine speed outputted by the autonomous optimizer 350 into the neural networks 362a and 362b and linearly transforms the output of the neural networks 362a and 362b according to Equation (1) below. The input information of the throttle opening, the rate of change of the throttle opening, and the engine speed are used in a normalized form respectively. In Equation (1) below, Y is an evolutionary correction factor or evolutionary transient correction factor, x is the output of the neural networks 362a and 362b, and G is a predetermined gain.

$$Y = 2 \times Gx - G \qquad \ldots (1)$$

In this way, by linearly transforming the output x of the neural networks 362a and 362b, it is possible to prevent the evolutionary correction factor or evolutionary transient correction factor outputted by the autonomous optimizer 350 from having inordinately large values, make the evolution simulation proceed slowly as a whole, and prevent engine 10 behavior from varying greatly in evaluation and the evolution simulation.

Next, the evolutionary adaptation manager 360 goes to Step S210, where it acquires fuel consumption and responsivity from the evaluation unit 370. It constructs a control module 362 based on the individuals information and starts controlling the engine 10 using the constructed control module 362. The evolutionary adaptation manager 360 uses the acquired fuel consumption and responsivity as evaluation value of the individual. The higher the evaluation value, the more excellent the individual can be regarded as in the GA-based evolution simulation, where high evaluation value means low fuel consumption in the case of the first evaluation value, and high responsivity in the case of the second evaluation value.

Next, the evolutionary adaptation manager 360 goes to Step S212, where it judges whether all the individuals in the population have gone through Steps S208 to S210. If it is judged that all the individuals have gone through the steps (Yes), the evolutionary adaptation manager 360 goes to Step S214.

In Step S214, the evolutionary adaptation manager 360 judges for each individual whether the second evaluation value, i.e., the responsivity, falls within the accepted range specified in Step S202. If it is judged that the responsivity does not fall within the accepted range (No), the evolutionary adaptation manager 360 goes to Step S216, where it eliminates the individual. Then, the evolutionary adaptation manager 360 goes to Step S218.

In Step S218, the evolutionary adaptation manager 360 judges whether all the individuals in the population have gone through Steps S214 to S216. If it is judged that all the individuals have gone through the steps (Yes), the evolutionary adaptation manager 360 goes to Step S220. Otherwise (No), it goes to Step S214.

In Step S220, a population whose responsivity falls within the accepted range is formed as a result of Steps S214 to S218. However, if a predetermined number (e.g., a half) or more of the individuals have not been eliminated, a selection process is carried out further to reduce the total number of individuals to half or less of the original number by screening individuals. Regarding selection processes, in addition to the roulette selection described above, preferential selection of the elite, simple elimination of the less fit, etc. are available.

Next, the evolutionary adaptation manager 360 goes to Step S222, where it performs a crossover process to cross over individuals based on the GA. Then, it goes to Step S224, where it performs a mutation process to cause mutations to individuals based on the GA. Then, it goes to Step S226, where it judges whether the number of generation changes has reached a predetermined number. If it is judged that the predetermined number has been reached (Yes), the evolutionary adaptation manager 360 goes to Step S228.

In Step S228, the evolutionary adaptation manager 360 extracts the individual with the highest evaluation value from the population, constructs an optimal control module based on the individuals information about the extracted individual, and establishes the optimal control module as the control module 362. Then, it goes to Step S230, where it makes the learning layer 200 learn the relationship between input and output of the control module 362. Then, it goes to Step S232, where it sets the output of the control module 362 to "1." This ends the sequence of processes and the evolutionary adaptation manager 360 returns to the original process.

On the other hand, if it is judged in Step S226 that the number of generation changes is less than the predetermined number (No), the evolutionary adaptation manager 360 goes to Step S206.

On the other hand, if it is judged in Step S212 that not all the individuals in the population have gone through the Steps S208 to S210 (No), the evolutionary adaptation manager 360 goes to Step S234, where it reads the individuals information about the next individual in the population. Then, it goes to Step S208.

Next, operation of the above embodiment will be described with reference to drawings.

To optimize the engine 10 and electronic throttle 12 for the user, first the user enters an evolution start instruction in the input unit 322.

Upon receiving the evolution start instruction from the user, the interactive optimizer 310 generates a population consisting of nine individuals through Steps S100 to S102 and prepares individuals information about each of the individuals. In this case, the control coefficients $SP_1$, and $SP_2$ which represent static characteristics and two control coefficients DR and AG which represent dynamic characteristics are assigned to the individuals information on each individual.

After the population is generated, an evolution simulation of the first generation is started. In the evolution simulation of the first generation, first the individuals information about the headmost individual is read out in Step S104. A control module 332 is constructed based on the individuals information read out and the electronic throttle 12 is controlled using the constructed control module 332 for a while. In Step S108, responsivity is acquired from the evaluation unit 340.

When all the individuals in the population have gone through Steps S106 to S108 in a similar manner, the responsivity of each individual is displayed as its evaluation value on the display 324 in Step 112. With reference to the evaluation of individuals displayed on the display 324, the user selects some individuals from the population with desired characteristics. After the user selects individuals, the other individuals are erased leaving the selected individuals in Step S116, to screen the individuals in the population.

Figure 10:
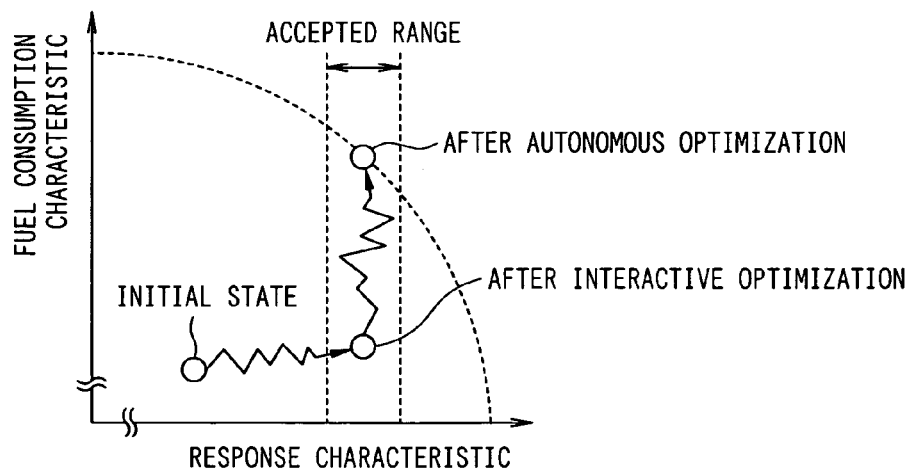
FIG. 10 is a diagram showing an order of optimizing control characteristics of an engine 10 and electronic throttle 12.
Figure 11:
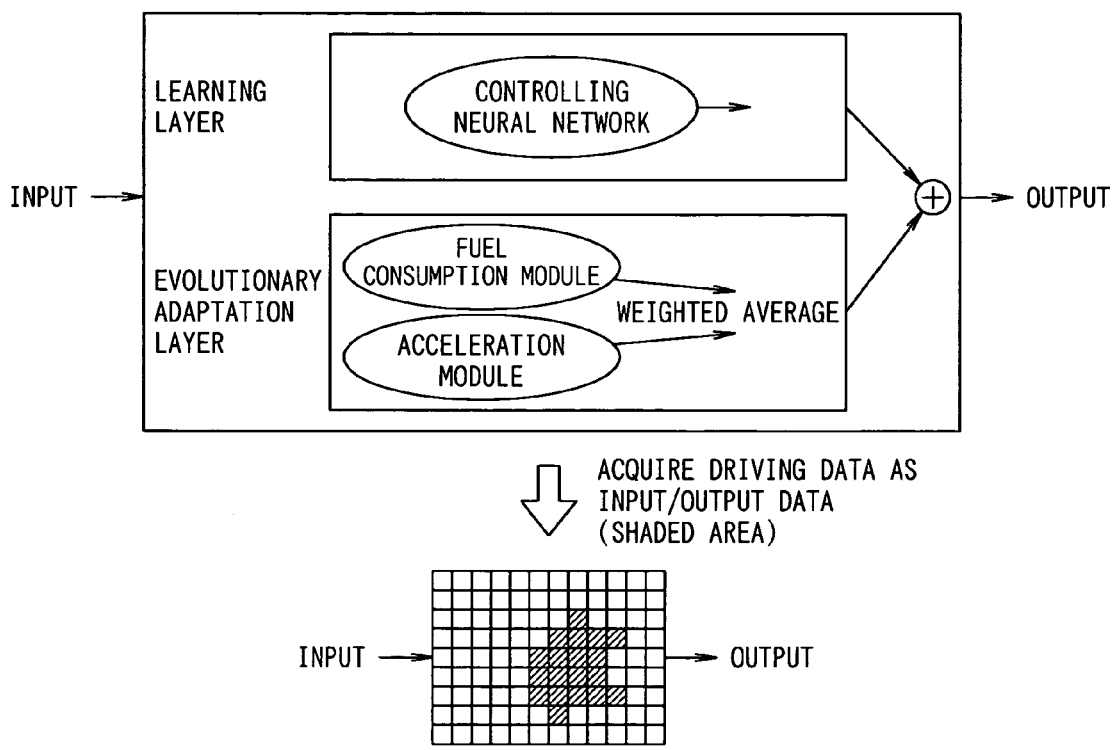
FIG. 11 is a diagram showing conceptually how a teacher data set acquires new teacher data.

Next, a crossover process and mutation process are performed in Steps S118 and S120, respectively. This ends the evolution simulation of the first generation. Subsequently, evolution simulations are repeated in a similar manner until characteristics satisfactory to the user are obtained or the number of generation changes reaches a predetermined number. Consequently, the response characteristics are optimized for the user as shown in FIG. 10. In the example of FIG. 10, the point located near the center of the accepted range corresponds to the optimized characteristics. FIG. 10 is a diagram showing an order of optimizing the control characteristics of the engine 10 and electronic throttle 12.

When evolution simulations are completed, in Steps S126 and S128, an evolution start request is output to the autonomous optimizer 350, the individual with the highest evaluation value is extracted from the population, and using the evaluation value of the extracted individual as responsivity, a predetermined range around the responsivity is output as an accepted range of the responsivity to the autonomous optimizer 350.

When an evolution start request is input in the autonomous optimizer 350, in Steps S202 and S204, the accepted range of responsivity is received, a population consisting of nine individuals is generated, and individuals information about each of the individuals are prepared. Coupling coefficients of synapses in the neural networks 362a and 362b are assigned to the individuals information.

After the population is generated, an evolution simulation of the first generation is started. In the evolution simulation of the first generation, first in Steps S206 and S208, the individuals information about the headmost individual is read out, a control module 362 is constructed based on the individuals information read out, and the engine 10 is controlled using the constructed control module 362 for a while. In Step S210, fuel consumption and responsivity are acquired from the evaluation unit 370.

When all the individuals in the population have gone through Steps S208 to S210 in a similar manner, it is judged in Step S214 whether the second evaluation value, i.e., the responsivity, of each individual falls within the accepted range specified in Step S202. Then, the individuals whose responsivity falls outside the accepted range are eliminated in Step S216. Consequently, the individuals whose responsivity falls within the accepted range are allowed to survive as candidates for parent individuals that will produce individuals of the next generation.

Next, selection, crossover, and mutation processes are performed in Steps S220 to S224. This ends the evolution simulation of the first generation. Subsequently, evolution simulations are repeated in a similar manner until the number of generation changes reaches a predetermined number. Consequently, the fuel consumption characteristics are optimized autonomously so that the responsivity will fall within the accepted range as shown in FIG. 10. In the example of FIG. 10, the point located on the maximal curve (broken line) of the fuel consumption characteristics and response characteristics and located within the accepted range corresponds to the optimized characteristics.

When evolution simulations are completed, in Step S228, the individual with the highest evaluation value is extracted from the population, an optimal control module is constructed based on the individuals information about the extracted individual, and the optimal control module is established as the control module 362.

Figure 12:
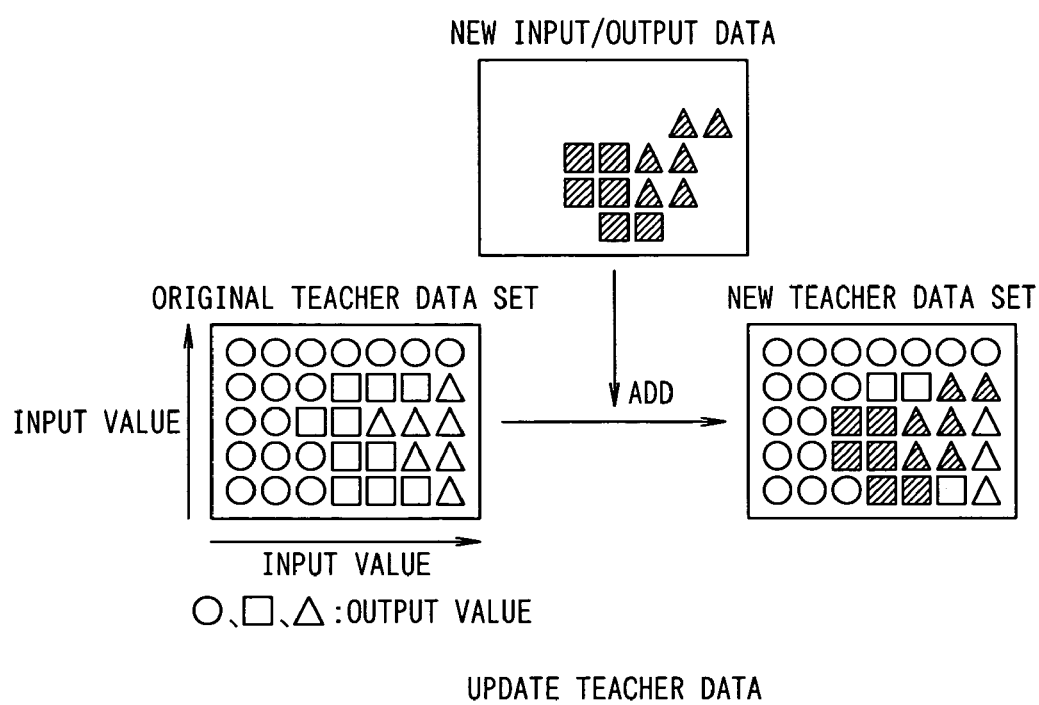
FIG. 12 is a diagram showing conceptually how a teacher data set is updated.

Next, in Step S230, the learning layer 200 is made to learn the relationship between input and output of the control module 362. In this learning, input information such as actual engine speed obtained by the optimal control module is controlled using the evolutionary correction factor and evolutionary transient correction factor. When the autonomous optimizer 350 starts to perform control using the evolutionary correction factor and evolutionary transient correction factor, the learning neural network in the learning layer 200 learns the relationship between input and output of the control module 362 as well as the relationship between input and output of the controlling neural network in the learning layer 200. Meanwhile, the output from the autonomous optimizer 350 is produced based on the individual with the highest evaluation value obtained previously, and thus control rules do not vary with time. In the learning described above, the input/output between the autonomous optimizer 350 and the controlling neural network in the learning layer 200 is averaged over a certain time and the result is used as input/output data in updating a teacher data set. For example, if average engine speed is 5000 rpm, average throttle opening is 20, average intake air temperature is 28° C., average atmospheric pressure is 1013 hPa when averaged over one second, these data are added to the output from the autonomous optimizer 350 and output from the controlling neural network in the learning layer 200 during the same period and the results are used as input/output data (see FIG. 11). This input/output data is added to old teacher data to obtain a new teacher data set. In so doing, old teacher data within a certain Euclidean distance from new data in the teacher data set is deleted. This is shown in FIG. 12. As initial values of teacher data set, the outputs for all input data are set to "1." The learning layer 200 learns the coupling coefficients of synapses in the learning neural network based on the updated teacher data set. The coupling coefficients are learned until the difference between actual control output and virtual control output becomes equal to or lower than a threshold, where the virtual control output is obtained from the output of the learning neural network which is learning and the basic injection quantity and transient correction factor received from the reflective layer 100. When this learning is finished, the learning neural network switches to a controlling neural network and the previous controlling neural network switches to a learning neural network. Then, the learning layer 200 determines and outputs the learned correction factor and learned transient correction factor using the new controlling neural network. In Step S232, the output of the control module 362 is set to "1" and control is passed to the learning layer 200 and reflective layer 100. The initial value of controlling neural network in the learning layer 200 is set such that the output will always be "1." This allows control to be performed only by the reflective layer 100 and autonomous optimizer 350 in the initial state.

Thus, this embodiment comprises the interactive optimizer 310 which controls response characteristics and the autonomous optimizer 350 which controls fuel consumption characteristics, in which the interactive optimizer 310 searches for an optimal solution of the responsivity calculator 342 using the GA while repeatedly evaluating, interactively, the responsivity outputted from the responsivity calculator 342 which receives control coefficients that affect the control characteristics of the interactive optimizer 310 and outputs the responsivity, and the autonomous optimizer 350 searches for an optimal solution of the fuel consumption calculator 372 using the GA while repeatedly evaluating, autonomously, the fuel consumption outputted from the fuel consumption calculator 372 such that the responsivity will be within a predetermined range based on the responsivity determined from the optimal solution found in the optimization of the interactive optimizer 310 using the fuel consumption calculator 372 which receives control coefficients that affect the control characteristics of the autonomous optimizer 350 and outputs the fuel consumption.

This makes it possible to search for a control coefficients which will provide responsivity more in line with user requirements with relatively reduced time requirements for optimization. Especially, after the interactive optimizer 310 completes optimization, the autonomous optimizer 350 can carry out optimization relatively quickly without sacrificing responsivity so much.

Furthermore, according to this embodiment, what is evaluated by the interactive optimizer 310 is responsivity and what is evaluated by the autonomous optimizer 350 is fuel consumption.

Consequently, among the control characteristics of the engine 10, response characteristics can be optimized for the user and fuel consumption characteristics can be optimized according to predetermined evaluation criteria.

Furthermore, according to this embodiment, the correction factor for the fuel injection quantity of the engine 10 or correction factor for the transient correction factor is generated by the neural networks 362a and 362b. Coupling coefficients of synapses in the neural networks 362a and 362b are assigned to individuals information.

This makes it possible to determine coupling coefficients of synapses in the neural networks 362a and 362b in such a way that high evaluation value can be expected.

In the above embodiments, the GA corresponds to the optimizing algorithm described in any of claims 1, 3 to 5, 7, 8, 10, and 12 or the evolutionary optimizing algorithm described in claim 8. The coupling coefficients of synapses in the neural networks 362a and 362b correspond to the control coefficients described in claim 3, 5, 8, or 10. The RAM corresponds to the storage means described in claim 2 or 4. The evaluation units 340 and 370 correspond to the evaluation value calculation means described in claim 2, 4, or 8. The input unit 322 corresponds to the evaluation input means described in claim 2 or 4. The engine 10 and electronic throttle 12 correspond to the controlled object described in any of claims 3 to 5, 7, 8, or 10.

Also, in the above embodiments, the interactive optimizer 310 corresponds to the first control system described in claim 5, the autonomous optimizer 350 corresponds to the second control system described in claim 5, the responsivity calculator 342 corresponds to the first evaluation function described in claim 5 or 7, and the fuel consumption calculator 372 corresponds to the second evaluation function described in claim 5 or 7. Also, Steps S118, S120, S222, and S224 correspond to individuals information manipulation means described in claim 8 while Steps S116, and S214 to S220 correspond to the individuals selection means described in claim 8.

Incidentally, in the above embodiments, the response characteristics are optimized by repeating evaluation performed by interactive evaluation method, the accepted range of responsivity is set, and then the fuel consumption characteristics are optimized by repeating evaluation performed by autonomous evaluation method so that the responsivity will fall within the accepted range, but this is not restrictive, and it is also possible to optimize the fuel consumption characteristics by repeating evaluation performed by autonomous evaluation method before setting an accepted range of the fuel consumption characteristics and optimizing the response characteristics by repeating evaluation performed by interactive evaluation method so that the fuel consumption will fall within the accepted range. Of course, there is no need to stick to these orders, and these operations may be performed bit by bit alternately or may be performed concurrently.

Also, in one of the above embodiments, the object controlled by the controller 30 is the engine 10, but this is not restrictive and any object may be controlled by the controller 30. For example, the controller 30 may also be applied to damping characteristics of car suspensions or seat, assisting characteristics of an auxiliary power unit in a bicycle or wheelchair equipped with an electric motor or engine as auxiliary power, or motion characteristics (brisk movements or slow movements) of a personal robot.

Also, although fuel injection quantity is used as control output in this embodiment, when the engine 10 is a controlled object, other possible control outputs include duration of injection, ignition timing, intake valve timing, electronic throttle opening, valve lift, exhaust valve timing, and intake/exhaust control valve timing. The intake control valve is a valve installed in the intake pipe to control tumble and swirl while the exhaust control valve is a valve installed in the exhaust pipe to control exhaust pulsation.

Also, although hierarchical neural networks are used for the learning layer 200 in this embodiment, this is not restrictive and, for example, a CMAC may be used for a control system in the learning layer 200. The advantages of using a CMAC include excellent capability for additional learning, high learning speed, etc.

Also, although in the above embodiments, the correction factor for the fuel injection quantity of the engine 10 or correction factor for the transient correction factor is generated by the neural networks 362a and 362b and coupling coefficients of synapses in the neural networks 362a and 362b are assigned to individuals information, this is not restrictive and the correction factor for the fuel injection quantity of the engine 10 or correction factor for the transient correction factor may be assigned directly to the individuals information.

This will make it possible to determine the correction factor for the fuel injection quantity of the engine 10 or correction factor for the transient correction factor in such a way that high evaluation value can be expected.

Also, although in the above embodiments, the correction factor for the fuel injection quantity of the engine 10 or correction factor for the transient correction factor is generated by the neural networks 362a and 362b, this is not restrictive and the fuel injection quantity of the engine 10, transient correction factor, correction factor for the fuel injection quantity, or correction factor for the transient correction factor may be generated by the neural networks 362a and 362b. This also applies to the configuration in which they are calculated directly without involving the neural networks 362a and 362b.

Also, although in the above embodiments, the GA is used to optimize the fuel consumption characteristics and response characteristics of the engine 10, this is not restrictive and an evolutionary algorithm such as a GP or ES may also be used.

Also, although in the above embodiments, programs prestored in a ROM are executed to perform the processes in the flowcharts of FIGS. 6 and 9, this is not restrictive and programs for these procedures may be read into a RAM from a recording medium before execution.

The recording medium here may be a semiconductor recording medium such as a RAM or ROM; magnetic recording medium such as an FD or HD; optically readable recording medium such as a CD, CDV, LD, or DVD; magneto-optical recording medium such as an MO. In other words, it may be any recording medium regardless of whether it is electronic, magnetic, or optical as long as it is computer-readable.

INDUSTRIAL APPLICABILITY

As described above, the optimal solution search device described in claim 1 or 2 of the present invention has the advantage of being able to search for an optimal solution in line with user requirements with relatively reduced time requirements for optimization.

Also, the algorithm-based optimizing controller described in claim 3 or 11 of the present invention has the advantage of being able to search for an optimal solution in line with user requirements with relatively reduced time requirements for optimization.

Furthermore, the algorithm-based optimizing controller described in claim 5 of the present invention has the advantage that after the first control system completes optimization, the second control system can carry out optimization relatively quickly without sacrificing the optimal evaluation value of the first evaluation function so much.

Furthermore, the algorithm-based optimizing controller described in claim 6 of the present invention has the advantage that the first control system can carry out optimization relatively quickly and that after the first control system completes optimization, the second control system can carry out optimization without sacrificing the optimal evaluation value of the first evaluation function so much.

Furthermore, the algorithm-based optimizing controller described in claim 7 of the present invention has the advantage that among the control characteristics of the engine, response characteristics can be optimized for the user and fuel consumption characteristics can be optimized according to predetermined evaluation criteria.

Furthermore, the algorithm-based optimizing controller described in claim 9 of the present invention has the advantage of being able to determine fuel injection quantity, a transient correction factor, a correction factor for the fuel injection quantity, or a correction factor for the transient correction factor in such a way that high evaluation value can be expected.

Furthermore, the algorithm-based optimizing controller described in claim 10 of the present invention has the advantage of being able to determine coupling coefficients of synapses in neural networks in such a way that high evaluation value can be expected.

Furthermore, the algorithm-based optimizing controller described in claim 11 of the present invention has the advantage that among the control characteristics of an electric motor, speed change characteristics can be optimized for the user and power consumption characteristics can be optimized according to predetermined evaluation criteria.

On the other hand, the optimal solution search program described in claim 12 has the same advantage as that of the optimal solution search device disclosed in claim 5.

Furthermore, the optimal solution search program set forth in claim 13 of the present invention has the same advantage as that of the optimal solution search device disclosed in claim 6.

The invention claimed is:

1. An algorithm-based optimizing controller which optimizes control characteristics of a control system by searching for an optimal solution of an evaluation function using an optimizing algorithm while repeatedly evaluating output from the evaluation function which receives input of control coefficients that affect control characteristics of the control system for controlling characteristics of a controlled object and outputs the control characteristics, characterized in that:

searches based on the optimizing algorithm are carried out using a combination of interactive evaluation method evaluating the output from the evaluation function based on interaction with a user and autonomous evaluation method evaluating the output from the evaluation function based on predetermined evaluation criteria;

the controller comprises a first control system for controlling a first characteristic of the controlled object, and a second control system for controlling a second characteristic of the controlled object;

the first control system searches for an optimal solution of a first evaluation function using the optimizing algorithm while repeatedly evaluating, by the interactive evaluation method, the output from the first evaluation function which receives input of control coefficients that affect control characteristics of the first control system and outputs the control characteristics; and the second control system searches for an optimal solution of a second evaluation function using the optimizing algorithm while repeatedly evaluating, by the autonomous evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

2. An algorithm-based optimizing controller which optimizes control characteristics of a control system by searching for an optimal solution of an evaluation function using an optimizing algorithm while repeatedly evaluating output from the evaluation function which receives input of control coefficients that affect control characteristics of the control system for controlling characteristics of a controlled object and outputs the control characteristics, characterized in that:

searches based on the optimizing algorithm are carried out using a combination of interactive evaluation method evaluating the output from the evaluation function based on interaction with a user and autonomous evaluation method evaluating the output from the evaluation function based on predetermined evaluation criteria;

the controller comprises a first control system for controlling a first characteristic of the controlled object, and a second control system for controlling a second characteristic of the controlled object;

the first control system searches for an optimal solution of the first evaluation function using the optimizing algorithm while repeatedly evaluating, by the autonomous evaluation method, the output from the first evaluation function which receives input of control coefficients that affect control characteristics of the first control system and outputs the control characteristics; and the second control system searches for an optimal solution of a second evaluation function using the optimizing algorithm while repeatedly evaluating, by the interactive evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

3. The algorithm-based optimizing controller according to claim 1, wherein:

the controlled object is an engine; and what undergoes the interactive evaluation among the outputs from the first evaluation function and the second evaluation function is responsivity determined by a rate of change in rotational speed of the engine and a rate of change in throttle opening while what undergoes the autonomous evaluation among the outputs from the first evaluation function and the second evaluation function is fuel consumption of the engine.

4. The algorithm-based optimizing controller according to claim 1, wherein: the optimizing algorithm comprises individuals information manipulation means which virtually generates a population consisting of a set of a plurality of individuals, generates individuals information about each of the individuals by likening it to genetic information assigns said control coefficient to the individuals information, and performs information manipulations on the individuals information by imitating genetic manipulations, evaluation value calculation means which calculates evaluation value of the individuals, and individuals selection means which screen the individuals based on the evaluation value calculated by the evaluation value calculation means; and the optimizing algorithm is an evolutionary optimizing algorithm which moves processing one generation ahead after going through at least one genetic manipulation by the individuals information manipulation means and one individuals selection by the individuals selection means.

5. The algorithm-based optimizing controller according to claim 4, wherein:

the controlled object is an engine; and fuel injection quantity of the engine, a transient amount of correction for use to correct the fuel injection quantity in transient state of the engine, and a correction value to the fuel injection quantity or a correction value to the transient amount of correction are assigned to the individuals information as the control coefficients.

6. The algorithm-based optimizing controller according to claim 4, wherein:

the controlled object is an engine;

fuel injection quantity of the engine, a transient amount of correction for use to correct the fuel injection quantity in transient state of the engine, and a correction value to the fuel injection quantity or a correction value to the transient amount of correction are generated by neural networks; and coupling coefficients of synapses in the neural networks are assigned to the individuals information as the control coefficients.

7. The algorithm-based optimizing controller according to claim 1, wherein:

the controlled object is an electric motor; and what undergoes the interactive evaluation among the outputs from the first evaluation function and the second evaluation function is a speed change rate of the electric motor while what undergoes the autonomous evaluation among the outputs from the first evaluation function and the second evaluation function is power consumption of the electric motor.

8. An optimal solution search program which is a computer-executable program for optimizing control characteristics of a first control system for controlling a first characteristic of a controlled object and a second control system for controlling a second characteristic of the controlled object, by searching for an optimal solution of an evaluation function using an optimizing algorithm while repeatedly evaluating output from the evaluation function which receives input of control coefficients that affect control characteristics of the control system for controlling characteristics of the controlled object and outputs the control characteristics, characterized in that the program makes the computer:

carry out searches based on the optimizing algorithm using a combination of interactive evaluation method evaluating the output from the evaluation function based on interaction with a user and autonomous evaluation method evaluating the output from the evaluation function based on predetermined evaluation criteria;

search for an optimal solution of a first evaluation function, in the first control system, using the optimizing algorithm while repeatedly evaluating, by the interactive evaluation method, the output from the first evaluation function which receives input of control coefficients that affect control characteristics of the first control system and outputs the control characteristics; and search for an optimal solution of a second evaluation function, in the second control system, using the optimizing algorithm while repeatedly evaluating, by the autonomous evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

9. An optimal solution search program which is a computer-executable program for optimizing control characteristics of a first control system for controlling a first characteristic of a controlled object and a second control system for controlling a second characteristic of the controlled object, by searching for an optimal solution of an evaluation function using an optimizing algorithm while repeatedly evaluating output from the evaluation function which receives input of control coefficients that affect control characteristics of the control system for controlling characteristics of the controlled object and outputs the control characteristics, characterized in that the program makes the computer:

carry out searches based on the optimizing algorithm using a combination of interactive evaluation method evaluating the output from the evaluation function based on interaction with a user and autonomous evaluation method evaluating the output from the evaluation function based on predetermined evaluation criteria;

search for an optimal solution of a first evaluation function, in the first control system, using the optimizing algorithm while repeatedly evaluating, by the autonomous evaluation method, the output from the first evaluation function which receives input of control coefficients that affect control characteristics of the first control system and outputs the control characteristics; and search for an optimal solution of a second evaluation function, in the second control system, using the optimizing algorithm while repeatedly evaluating, by the interactive evaluation method, the output from the second evaluation function such that the output from the first evaluation function will be within a predetermined range based on the output from the first evaluation function determined from the optimal solution found in the optimization of the first control system using the second evaluation function which receives input of control coefficients that affect control characteristics of the second control system and outputs the control characteristics as well as using the first evaluation function.

\* \* \* \* \*